(12) United States Patent
Black et al.

(10) Patent No.: US 12,378,986 B2
(45) Date of Patent: Aug. 5, 2025

(54) CUSTOMIZABLE FURNITURE

(71) Applicant: Adorn Home, Walnut Creek, CA (US)

(72) Inventors: Brian Black, Concord, CA (US); Mimi Tao, Concord, CA (US)

(73) Assignee: Adorn Home, Walnut Creek, CA (US)

( * ) Notice: Subject to any disclaimer, the term of this patent is extended or adjusted under 35 U.S.C. 154(b) by 76 days.

(21) Appl. No.: 18/312,855

(22) Filed: May 5, 2023

(65) Prior Publication Data
US 2024/0369089 A1  Nov. 7, 2024

Related U.S. Application Data

(60) Provisional application No. 63/343,166, filed on May 18, 2022.

(51) Int. Cl.
*F16B 12/52* (2006.01)
*F16B 1/00* (2006.01)

(52) U.S. Cl.
CPC ............... *F16B 12/52* (2013.01); *F16B 1/00* (2013.01); *F16B 2200/83* (2023.08)

(58) Field of Classification Search
CPC ......... F16B 12/52; F16B 1/00; F16B 2200/83
See application file for complete search history.

(56) References Cited

U.S. PATENT DOCUMENTS

| | | | | |
|---|---|---|---|---|
| 3,960,352 A * | 6/1976 | Plattner | ................ | F16M 11/045 248/188.4 |
| 4,549,711 A * | 10/1985 | Giltnane | ................ | A47C 7/002 248/188 |
| 5,203,528 A * | 4/1993 | Oke | ................ | A47B 91/06 D6/709.16 |
| 5,641,139 A * | 6/1997 | Miller | ................ | A47B 13/021 248/188.4 |
| 5,820,089 A * | 10/1998 | Lim | ................ | A47B 91/00 248/188.4 |
| 5,957,418 A * | 9/1999 | Nelson | ................ | A47B 13/021 248/188 |
| 6,547,196 B2 * | 4/2003 | Binnebose | ................ | A47B 55/00 248/188 |
| 6,629,506 B2 * | 10/2003 | Park | ................ | A47B 91/024 248/188 |
| 6,776,380 B1 * | 8/2004 | Kirk, Jr. | ................ | A47B 13/021 248/188.4 |

(Continued)

FOREIGN PATENT DOCUMENTS

| | | |
|---|---|---|
| DE | 202010016356 U1 | 3/2011 |
| RU | 190248 U1 | 6/2019 |
| WO | 2020040629 A1 | 2/2020 |

*Primary Examiner* — Monica E Millner
(74) *Attorney, Agent, or Firm* — Briggs Intellectual Property Law; Jeremy A. Briggs

(57) ABSTRACT

A customizable furniture is disclosed. The customizable furniture may include a furniture base including an upper base portion and a lower base portion. The customizable furniture may further include a metal aperture bar extending at the lower base portion and a leg base configured to be inserted in the metal aperture bar. The customizable furniture may additionally include an interchangeable leg casing configured to be removably attached to the leg base to enable attachment of the interchangeable leg casing with the furniture base. The interchangeable leg casing may include a cavity to receive the leg base.

18 Claims, 21 Drawing Sheets

(56) References Cited

U.S. PATENT DOCUMENTS

| | | | |
|---|---|---|---|
| 7,392,966 B1* | 7/2008 | Chen | A47B 91/00 248/188.8 |
| 7,988,236 B2* | 8/2011 | Brandtner | F16B 12/14 297/440.14 |
| 10,991,347 B2* | 4/2021 | Yamashita | F16M 13/005 |
| 11,083,306 B1* | 8/2021 | Thompson | A47C 31/023 |
| 2017/0095091 A1 | 4/2017 | Narasimhan | |
| 2020/0069068 A1* | 3/2020 | Hodgson | A47B 91/00 |
| 2024/0068228 A1* | 2/2024 | Mckenna | E04B 1/86 |

* cited by examiner

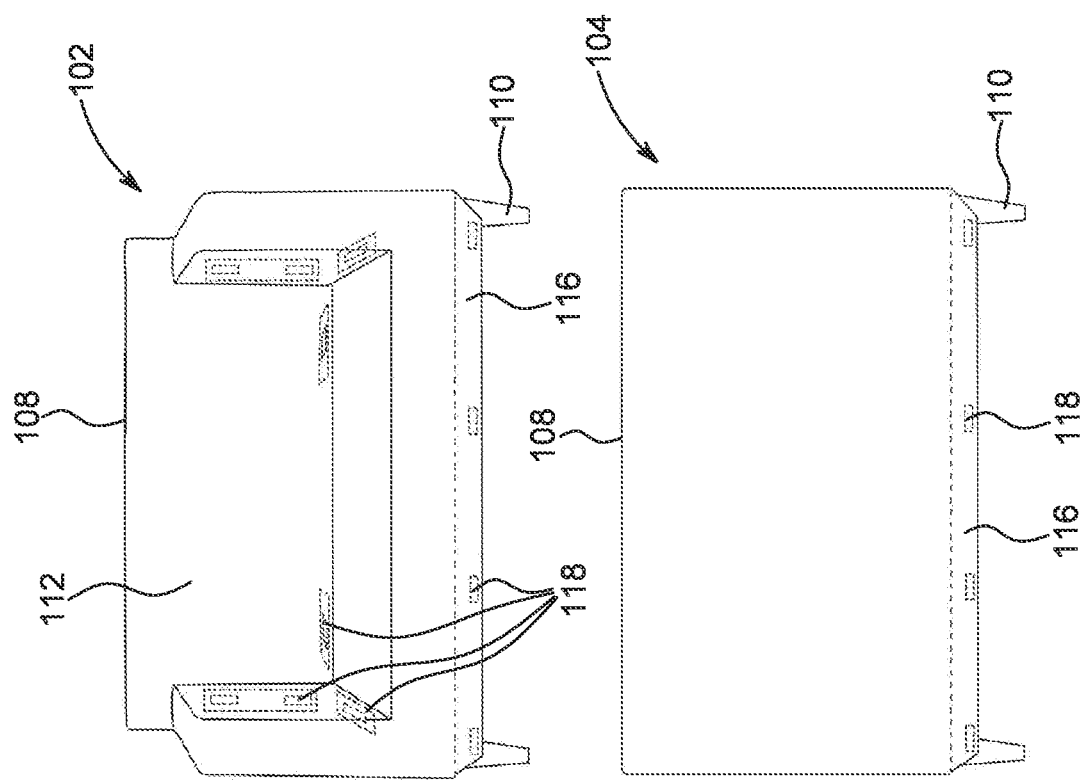
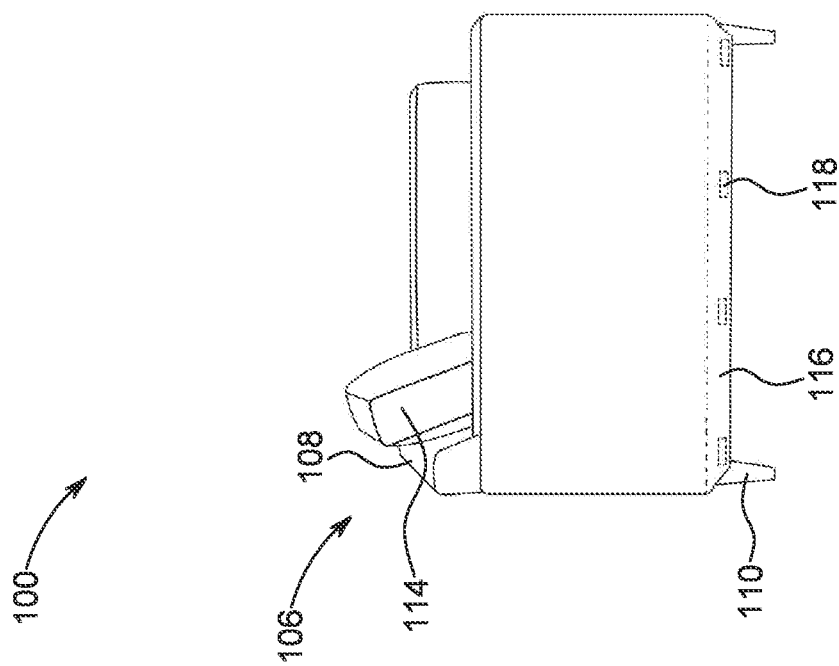
FIG. 1

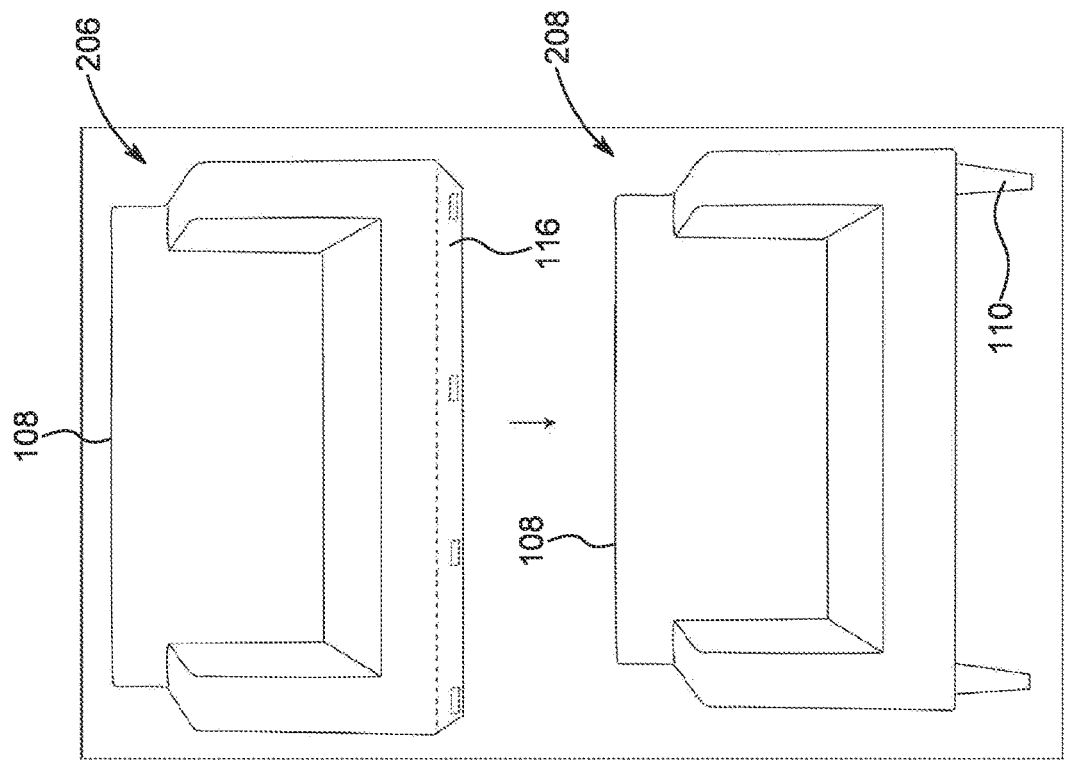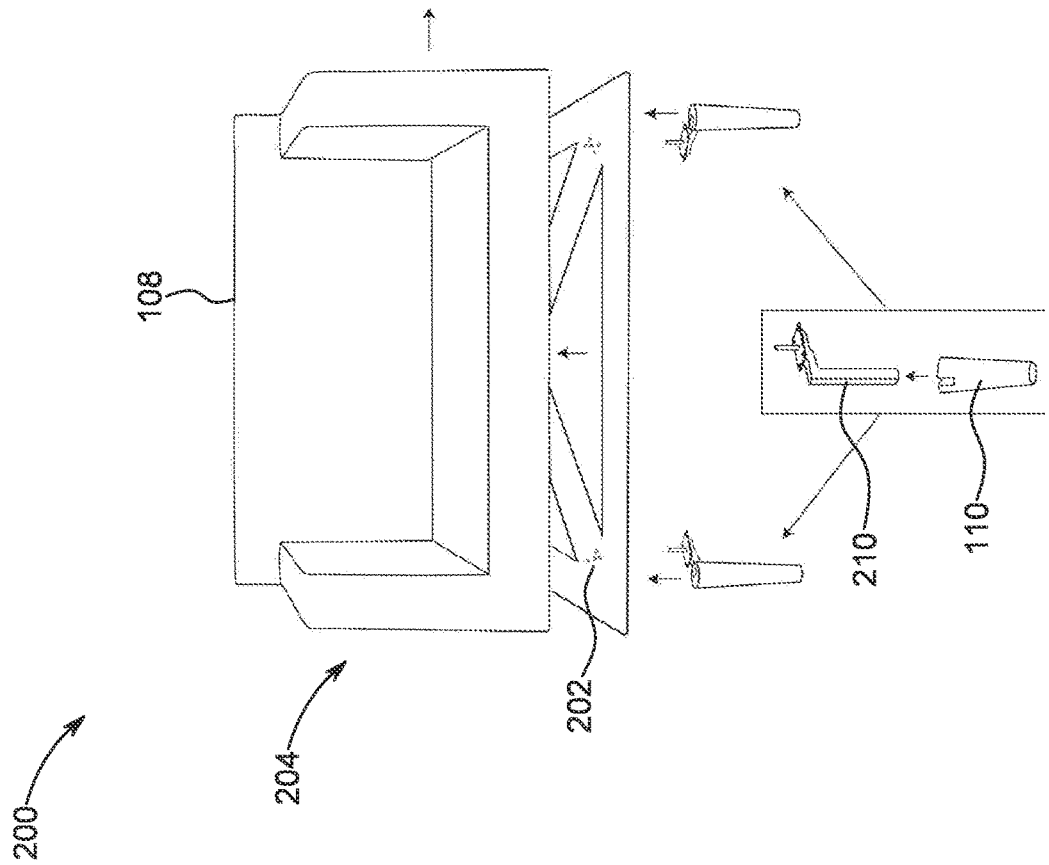
FIG. 2

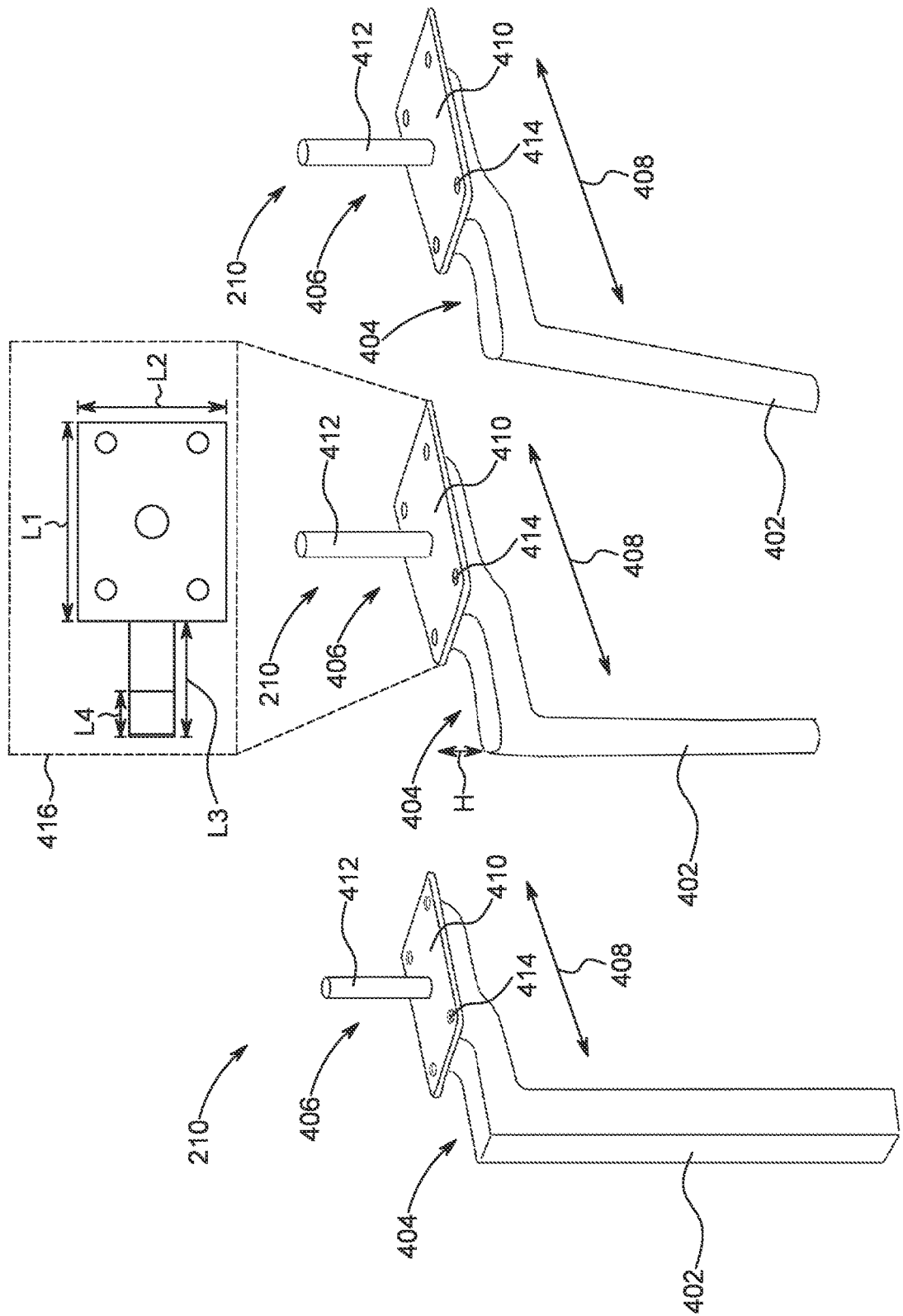

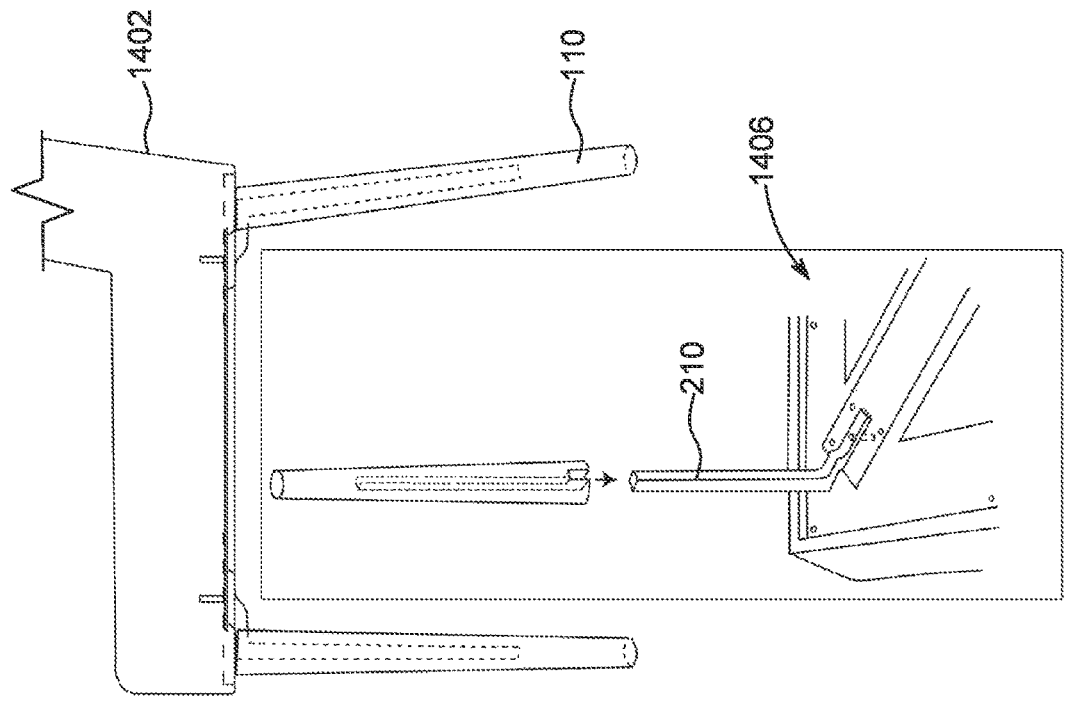
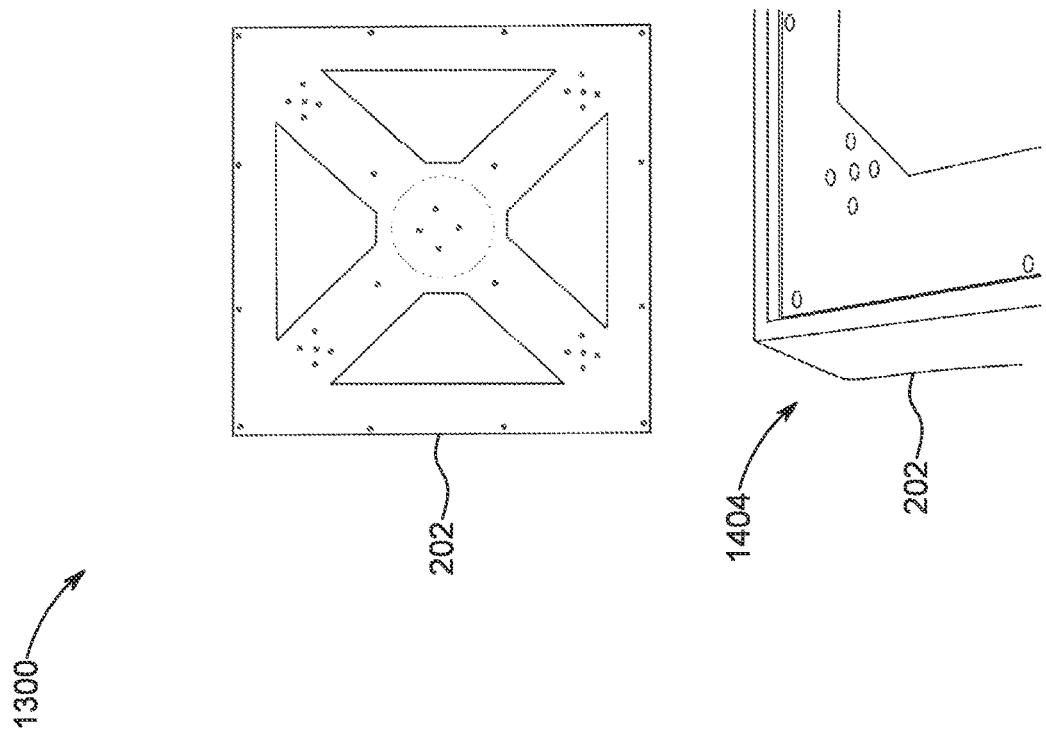
FIG. 14

CUSTOMIZABLE FURNITURE

CROSS-REFERENCE TO RELATED APPLICATIONS

This application claims priority to and the benefit of U.S. provisional application No. 63/343,166, filed May 18, 2022, which is hereby incorporated by reference herein in its entirety.

TECHNICAL FIELD

The present disclosure relates to a customizable furniture, and more specifically to a customizable furniture that includes interchangeable casing and interchangeable legs.

BACKGROUND

Most furniture items, such as sofas, beds, chairs, etc. are available to users in a variety of designs, shapes, and colors. A user may select and purchase a furniture item from several available options based on user's requirement and preference.

Typically, such furniture items have a long lifespan and are expensive. Therefore, users generally do not purchase these items frequently. For example, if the user purchases an expensive sofa, the user may not replace the sofa for months or even years.

Most furniture items have static designs that do not change over items' lifespan. Therefore, if the user intends to change an exterior design or appearance of an item that the user may have purchased, the user may be required to replace the item with a new version. For example, if the user changes user's home décor, the user may want to change the item look to match with the new home décor. In this case, the user may have to purchase a new item, which may have a look that matches the new home décor. Purchasing new items frequently may cause inconvenience to users and may not be financially viable.

Thus, there is a need for a furniture item that may enable the user to conveniently change furniture appearance, without replacing the furniture in entirety.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 1 depicts front, back and side views of an example customizable furniture in accordance with the present disclosure.

FIG. 2 depicts a front view of an example customizable furniture with interchangeable leg casings and interchangeable frame casing in accordance with the present disclosure.

FIGS. 4A, 4B, and 4C depict example embodiments of leg bases in accordance with the present disclosure.

FIG. 14 depicts the customizable furniture of FIG. 13 with interchangeable leg casings in accordance with the present disclosure.

DETAILED DESCRIPTION

Overview

Figure 3A:
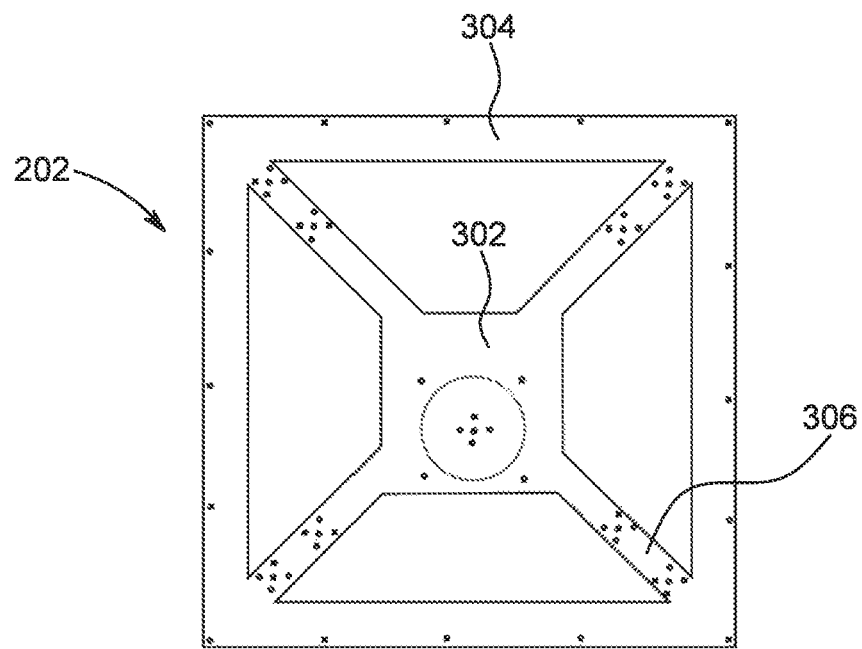
FIGS. 3A and 3B depict example embodiments of metal aperture bars in accordance with the present disclosure.

The present disclosure is directed towards a customizable furniture that enables a user to change furniture appearance conveniently. The furniture may be a sofa, a bed, a dining chair, a lounge chair, a coffee table, a bench, a chaise, a headboard, and/or the like. The furniture may include removable/interchangeable frame casing or slip-covers (to cover furniture frame) and interchangeable legs (or interchangeable leg casings) that may assist the user in changing furniture appearance.

The interchangeable frame casing may be magnetically coupled to the furniture. Specifically, the interchangeable frame casing may include magnets disposed at predetermined positions on the interchangeable frame casing. For example, the magnets may be disposed at hem associated with the interchangeable frame casing. The interchangeable frame casing may be magnetically coupled to a metal aperture bar or a metal strip that may be disposed at a furniture. For example, the metal aperture bar may be disposed under a furniture base. The metal aperture bar may be made of metal that may enable magnetic coupling of the metal aperture bar with the interchangeable frame casing. The use of magnetic coupling provides wrinkle-free look to the furniture frame. In addition, the magnets may slide left or right to adjust fitting of the frame casing.

In further aspects, the interchangeable legs may be removably attached to the metal aperture bar. In some aspects, the interchangeable legs may be removably attached to the metal aperture bar via a leg base. A leg base portion may be inserted into the interchangeable legs and another leg base portion may be inserted into the metal aperture bar to securely attach the interchangeable legs to the furniture base. In additional aspects, the leg base may be magnetically coupled to the interchangeable legs. The leg base may be made of metal and the interchangeable legs may include magnet, which may enable magnetic coupling between the leg base and the interchangeable legs.

The present disclosure discloses a customizable furniture that enables the user to change furniture design/appearance conveniently. The user may quickly disassemble and assemble the furniture as per user's design preferences. The furniture is sturdy in look and functionality, and securely holds all the parts in place. The furniture is economical to manufacture, reliable, and able to satisfy user expectations and requirements.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts a front view 102, a back view 104, and a side view 106 of an example customizable furniture 100 (or furniture 100) in accordance with the present disclosure. The customizable furniture 100 may be a sofa, a bed, a lounge chair, a dining chair, a counter chair, a bench, and/or the like. A user (not shown) may customize the furniture 100 to change furniture appearance, without requiring to change the furniture 100 in entirety. For example, the user may customize the furniture appearance when the user changes home décor, without requiring to purchase new furniture. In the exemplary aspect shown in FIG. 1, the furniture 100 may be a sofa, such as a single seat sofa.

The furniture 100 may include a furniture base 108 (or furniture frame) and interchangeable leg casings 110 or interchangeable legs 110 that may be removably attached to the furniture base 108. The furniture base 108 may be of any shape and design. In addition, the furniture base 108 may be made of any material such as wood, metal, plastic, a combination thereof, and/or the like. The interchangeable leg casing 110 may be of any shape and design. For example, the interchangeable leg casing 110 may be square legs, round legs, and/or the like.

The furniture base 108 may include an upper portion 112 and a lower portion (not shown in FIG. 1). The upper portion 112 may include a sitting area on which the user may sit. The upper portion 112 may include a backrest, as depicted in FIG. 1. The upper portion 112 may further include one or more cushions (shown as cushions 114 in the side view 106) that may be disposed on the sitting area. The cushions 114 may include seating cushions and back cushions, and may be of any size and shape to provide comfort to the user. The seat cushions may have memory foam and polyfiber blow.

The lower portion may be present at the underbelly of the sitting area. In some aspects, the lower portion may include a metal aperture bar or a metal strip (shown as metal aperture bar 202 in FIG. 2). Stated another way, the metal aperture bar may be disposed under the furniture base 108 so that the metal aperture bar may not be visible from outside. The metal aperture bar may be configured to enable the interchangeable leg casing 110 to be removably attached to the furniture base 108. The details of the metal aperture bar are described later in the description below in conjunction with FIG. 2.

The furniture 100 may further include an interchangeable frame casing 116 (or "cover") that may be configured to cover, fully or partially, the upper portion 112. The interchangeable frame casing 116 may be made of any material including, but not limited to, cotton, linen, velvet, wool, leather, and/or the like. The interchangeable frame casing 116 may be of any color and/or design. In some aspects, the interchangeable frame casing 116 may be additionally configured to cover the cushions 114.

In some aspects, the user may detach the interchangeable frame casing 116 from the furniture base 108 and replace the interchangeable frame casing 116 with a new interchangeable frame casing of a different design/appearance/material, which may enable the user to change the furniture appearance. In this manner, the user may change the furniture appearance, without requiring purchasing a new furniture.

In some aspects, the interchangeable frame casing 116 may be magnetically attached to the furniture base 108 (and to the cushions 114). The interchangeable frame casing 116 may include one or more magnets 118 that may be disposed in hem (e.g., edges) associated with the interchangeable frame casing 116 (or any other position) such that the magnets 118 may not be visible from outside. The hem may be of any size, for example, the hem may be 2 inches wide. In some aspects, the magnets 118 may be positioned on the sitting area (e.g., near furniture arms as depicted in FIG. 1 and on the cushions 114). For example, the magnets 118 may be hidden in a slot where the furniture arms and seat connect with a furniture back to hold the interchangeable frame casing 116 properly, as depicted in FIG. 1. The magnets 118 may of any size. For example, each magnet may be of 27 mm*8 mm*3 mm dimension, or any other similar dimension. The present disclosure is not limited to the dimensions and/or the arrangement of the magnets 118 described here or shown in FIG. 1.

In some aspects, the magnets 118 may be disposed at a predetermined distance from each other. For example, the magnets 118 may be disposed evenly or equidistant from each other. In an exemplary aspect, the magnets 118 may be 4 inches to 8 inches apart. In some aspects, the predetermined distance may be based on furniture width. The magnets 118 may be configured to magnetically couple with the metal aperture bar, thereby removably attaching the interchangeable frame casing 116 with the furniture base 108. In this manner, the interchangeable frame casing 116 may securely couple with the furniture 100, and provide a wrinkle free look to the furniture 100.

In further aspects, the furniture 100 may include one or more fastening elements that may be configured to securely and removably attach the interchangeable frame casing 116 with the furniture base 108. For example, the furniture 100 may include a zipper that may be located on a furniture 100 back side (e.g., at one corner from bottom hem edge to top seam of furniture 100) or elastic in proximity to interchangeable frame casing seam, which may enable the user to removably attach the interchangeable frame casing 116 with the furniture base 108. In further aspects, the furniture 100 may include Velcro to attach the interchangeable frame casing 116 with the furniture base 108.

FIG. 2 depicts a front view of an example customizable furniture 200 (or furniture 200) with the interchangeable leg casings 110 and the interchangeable frame casing 116 in accordance with the present disclosure. The furniture 200 may be same as the furniture 100. While describing FIG. 2, references will be made to FIGS. 3A-7.

In some aspects, the user may decouple/detach the interchangeable frame casing 116 from the furniture base 108 and may replace the interchangeable frame casing 116 with a new interchangeable frame casing of a different design and/or appearance. The new interchangeable frame casing may have same or equivalent dimensions (e.g., height and width) as the interchangeable frame casing 116. Similarly, the user may decouple/detach the interchangeable leg casings 110 and may replace the interchangeable leg casings 110 with new interchangeable leg casings of a different design and/or appearance.

The furniture 200 may include a metal aperture bar 202, as shown in view 204 of FIG. 2. The metal aperture bar 202 may be same as the metal aperture bar described in conjunction with FIG. 1. The metal aperture bar 202 may be disposed at a furniture base 108 lower portion (or underbelly), as depicted in the view 204. The metal aperture bar 202 may be a pre-assembled bar that may be made of metal.

Figure 3B:
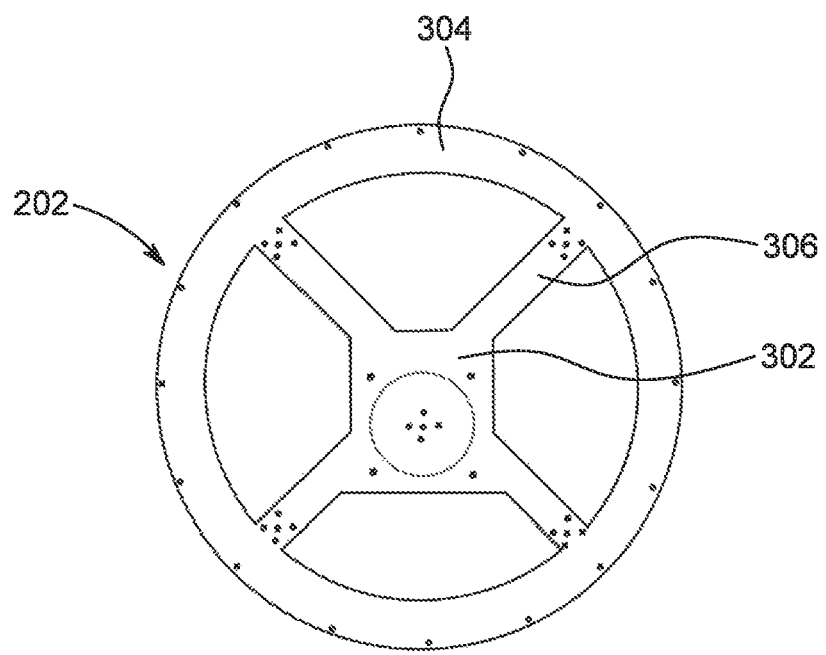

In some aspects, the metal aperture bar 202 may enable the user to removably attach the interchangeable leg casings 110 to the furniture base 108. Similarly, the metal aperture bar 202 may enable the user to removably attach the interchangeable frame casing 116 to the furniture base 108 (e.g., by magnetically coupling the magnets 118 and the metal aperture bar 202), as shown in view 206 of FIG. 2, to create a customizable furniture, as shown in view 208 of FIG. 2. Example shapes and structures of the metal aperture bar 202 are shown in FIGS. 3A and 3B. Specifically, FIGS. 3A and 3B depict example embodiments of the metal aperture bar 202 in accordance with the present disclosure.

As shown in FIGS. 3A and 3B, the metal aperture bar 202 may be square or circular in shape. The metal aperture bar 202 shape may be based on furniture type, size, and/or design. In some aspects, FIG. 3A depicts a stationary metal aperture bar 202 that may be attached to a non-rotating furniture and FIG. 3B depicts a swivel metal aperture bar 202 that may be used for rotating furniture such as lounge chair, coffee table, and/or the like.

The metal aperture bar 202 may include a connection plate 302 in a metal aperture bar center portion. The connection plate 302 may be of any shape. For example, the connection plate 302 may be square or rectangular in shape. The connection plate 302 may be a solid metal piece, and may be fully enclosed by an outer ring 304, as shown in FIGS. 3A and 3B. The outer ring 304 may be of any shape. For example, the outer ring 304 may be square, rectangular, or circular in shape. In some aspects, the outer ring 304 may be positioned at periphery of furniture base 108 lower portion.

In some aspects, the outer ring 304 may be disposed at a predetermined distance from the connection plate 302. The outer ring 304 may be attached to the connection plate 302 via a plurality of arms 306. For example, as shown in FIGS. 3A and 3B, the metal aperture bar 202 may include four arms 306 that may be disposed between the connection plate 302 and the outer ring 304. The arms 306 length may be same or different based on the position of the connection plate 302 in the metal aperture bar 202.

The metal aperture bar 202 may include a plurality of holes in the connection plate 302, the outer ring 304, and the plurality of arms 306. The metal aperture bar 202 may be attached to the furniture base 108 lower portion using fastening member such as screws. The screws may pass through the holes to connect the metal aperture bar 202 to the furniture base 108. The plurality of holes may further enable the connection of the metal aperture bar 202 with the interchangeable leg casings 110, which is described later in the description below.

In some aspects, the interchangeable leg casings 110 may be removably attached to the metal aperture bar 202 via a metal leg base 210 (or a leg base 210), as shown in FIG. 2. The leg base 210 may be of different shapes and designs. Example embodiments of the leg base 210 are depicted in FIGS. 4A-4C.

The leg base 210 may include a first member 402 and a second member 404 that may be integrated with each other to form a unified piece, as shown in FIGS. 4A-4C. The first member 402 may be configured to be inserted into the interchangeable leg casing 110, and the second member 404 may be configured to attach the leg base 210 to the metal aperture bar 202.

In some aspects, the second member 404 may extend laterally from a first member 402 top portion. The first member 402 and the second member 404 may be of any shape and dimension (e.g., length or width/diameter). For example, the first member 402 may be cuboid (as shown in FIG. 4A) or cylindrical (as shown in FIGS. 4B and 4C). In an exemplary aspect, the first member 402 may be 3 inches long and ⅝ inches wide. The first member 402 may be disposed at a predetermined angle relative to the second member 404. For example, the predetermined angle may be 90 degrees (as shown in FIGS. 4A and 4B) or greater than 90 degrees (as shown in FIG. 4C). The shape, dimension, and the predetermined angle as described herein and as shown in FIGS. 4A-4C may be based on dimensions and design of the interchangeable leg casing 110.

The second member 404 may include a proximal end and a distal end. The proximal end may be attached to the first member 402 top portion. The distal end may include a connection unit 406 configured to attach the leg base 210 to the metal aperture bar 202. Specifically, the second member 404 may include a rod 408 (of any shape and/or dimension) and the connection unit 406 may be positioned at a rod edge (e.g., at a rod edge top surface). In some aspects, the connection unit 406 may be disposed at a predetermined height "H" from the first member 402 top portion. In an exemplary aspect, the predetermined height may be ⅜ inches, which may enable the interchangeable frame casing 116 to couple with the metal aperture bar 202 efficiently and seamlessly and provide flush finish to the furniture 200.

In some aspects, the connection unit 406 may include a plate 410 and a peg 412. The plate 410 may be of any shape and size. For example, the plate 410 may be of rectangular or square shape. In an exemplary aspect, the plate 410 may have length "L1" of 3 inches, width "L2" of 2 and ¼ inches, and the first member 402 width "L4" of ⅝ inches, and a total length of the second member 404 (excluding the plate 410) and the first member 402 with "L3" of 1 and ¾ inches, as indicated in view 416 that depicts a top view of the leg base 210. Stated another way, the connection unit 406 may be disposed away from a first member 402 top portion (e.g., 1 and ¼ inches away from the first member 402 top portion). Also, as described above, the connection unit 406 may be disposed at the predetermined height "H" from the first member 402 top portion (e.g., ⅜ inches from the first member 402 top portion). Such arrangement creates a slot when the leg base 210 is attached to the metal aperture bar 202. The slot enables the interchangeable frame casing 116 to be neatly fitted into the slot and allows easy accessibility to remove and replace the interchangeable frame casing 116 without the need to remove the interchangeable leg casings 110 and/or the leg base 210. This also provides a clean and neatly fitted furniture corner and avoid bunching of the interchangeable frame casing 116.

The peg 412 may be configured to be inserted into the metal aperture bar 202. Specifically, the peg 412 may be configured to be inserted into a hole included in the metal aperture bar 202. The peg 412 may be an elongated pin that may be disposed at a connection unit 406 center portion (e.g., on a connection unit 406 top surface). The peg 412 may be of any shape and dimension. For example, the peg 412 may be a circular pin that may be 1⅝ inches long and may have a diameter of ¼ inches. In some aspects, a peg longitudinal axis may be parallel to a first member 402 longitudinal axis, as shown in FIGS. 4A and 4B. In other aspects, the peg longitudinal axis may be disposed at a predefined angle related to the first member 402 when the first member 402 may be slanted (relative to the second member 404), as shown in FIG. 4C.

The connection unit 406 may include a plurality of holes 414 that may be configured to receive fastening member such as screws (not shown), to attach the leg base 210 to the metal aperture bar 202. In some aspects, the holes 414 diameter may be smaller than peg 412 diameter. In some aspects, the connection unit 406 may include four holes that may be positioned around the peg 412, as shown in FIGS. 4A-4C. The plurality of holes 414 may be aligned with the plurality of holes included in the metal aperture bar 202 to attach the leg base 210 to the metal aperture bar 202, via the fastening member.

Figure 5B:
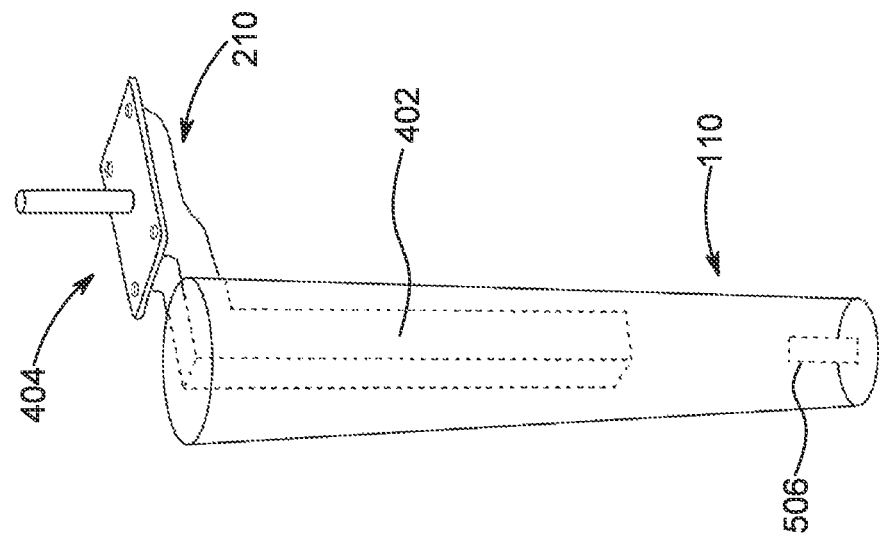
FIGS. 5A and 5B depict snapshots of an interchangeable leg casing and attachment between a leg base and the interchangeable leg casing in accordance with the present disclosure.
Figure 5A:
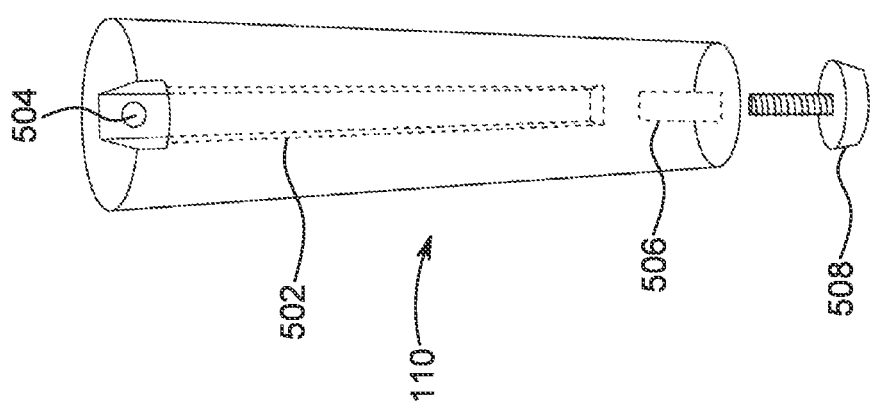

In further aspects, the interchangeable leg casings 110 may include a cavity or a slot 502, as shown in FIG. 5A. The slot 502 may be configured to receive the first member 402 to removably attach the interchangeable leg casing 110 to the leg base 210, as shown in FIG. 5B. Specifically, FIGS. 5A and 5B depict snapshots of the interchangeable leg casing 110 and attachment of the leg base 210 with the interchangeable leg casing 110 in accordance with the present disclosure. As shown in FIG. 5A, the slot 502 may extend along a predefined length or portion of the interchangeable leg casing 110 from an interchangeable leg casing 110 top portion. The predefined length may be based on or equivalent to the first member 402 length. For example, the predefined length may be 3 and ½ inches. Similarly, the slot 502 may have a predefined width/diameter that may be based on first member width/diameter.

The interchangeable leg casing 110 may further include a magnet 504 that may enable a magnetic coupling between the interchangeable leg casing 110 and the leg base 210, to securely attach the interchangeable leg casing 110 with the leg base 210. As described above, the leg base 210 may be made of metal that may magnetically couple with the magnet 504. In further aspects, the interchangeable leg casing 110 may include an additional slot 506 disposed at an interchangeable leg casing 110 bottom portion. The additional slot 506 may be configured to receive an external component 508. The external component 508 may include, for example, a height adjusting component, a leg supporting element, an adjustable leveler for stability on uneven floors, and/or the like.

Figures 6A, 6B, 6C:
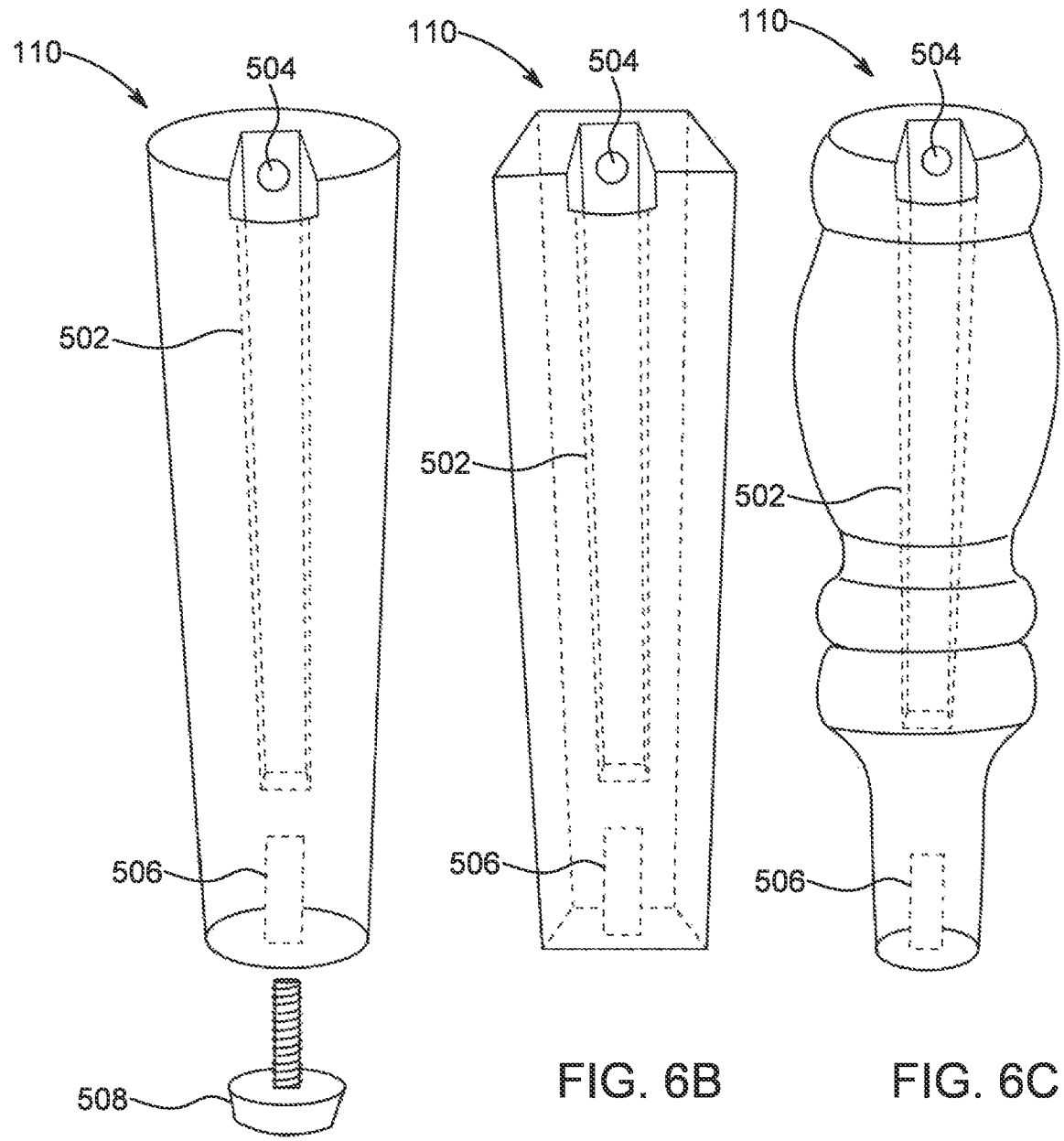
FIGS. 6A-6C depict example embodiments of interchangeable leg casings in accordance with the present disclosure.

As described above, the interchangeable leg casing 110 may be of different sizes and designs. Example embodiments of the interchangeable leg casing 110 are shown in FIGS. 6A-6C. In a first embodiment, as shown in FIG. 6A, the interchangeable leg casing 110 may be shaped as a cylinder with a top portion diameter greater than a bottom portion diameter. In another embodiment, as shown in FIG. 6B, the interchangeable leg casing 110 may be shaped as a truncated pyramid with a top portion width greater than a bottom portion width. In yet another embodiment, as shown in FIG. 6C, the interchangeable leg casing 110 may have an ornamental design with varying diameters along an interchangeable leg casing length.

Figure 7A:
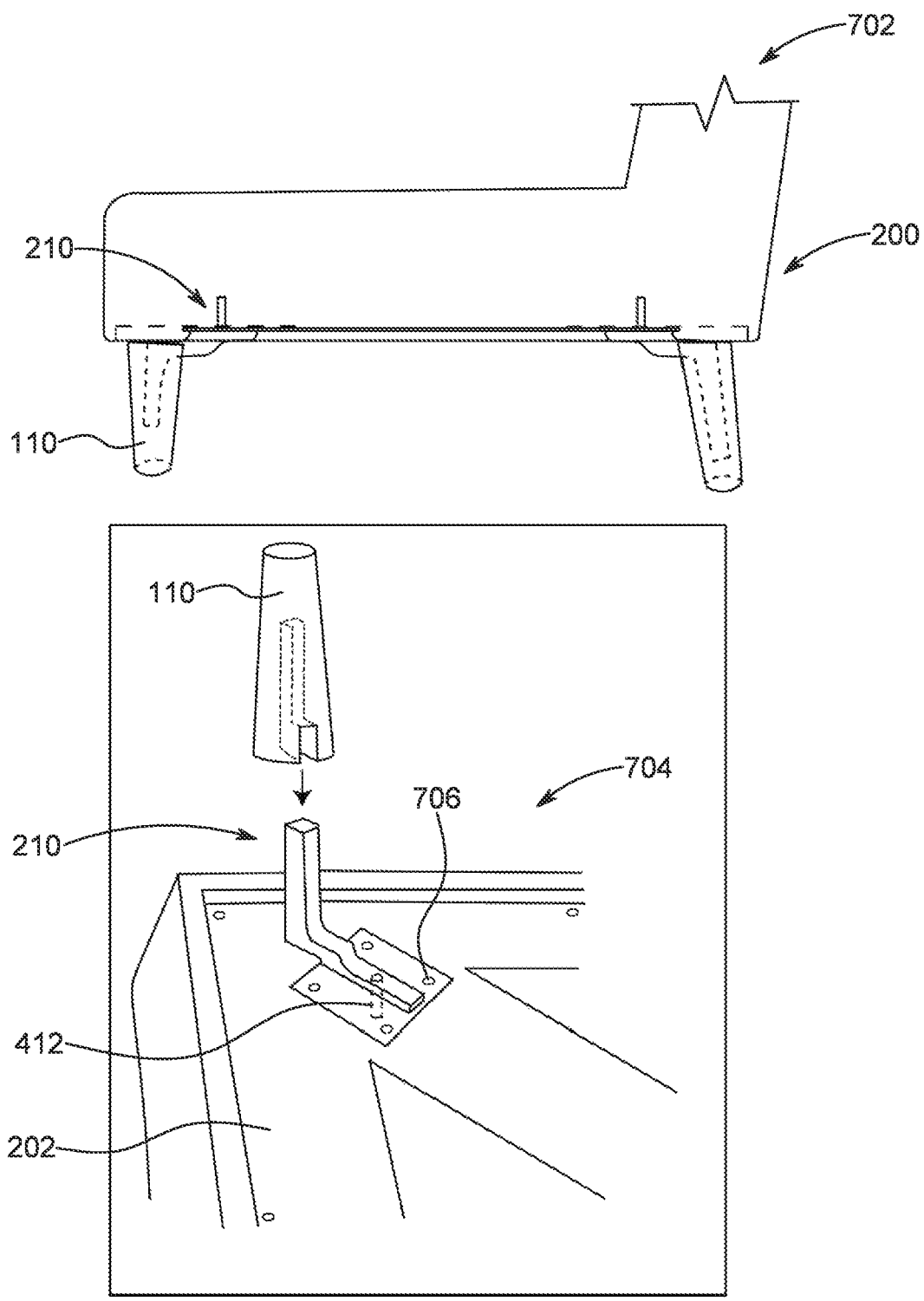
FIGS. 7A and 7B depict snapshots of an attachment between an interchangeable leg casing with the furniture of FIG. 1 in accordance with the present disclosure.
Figure 7B:
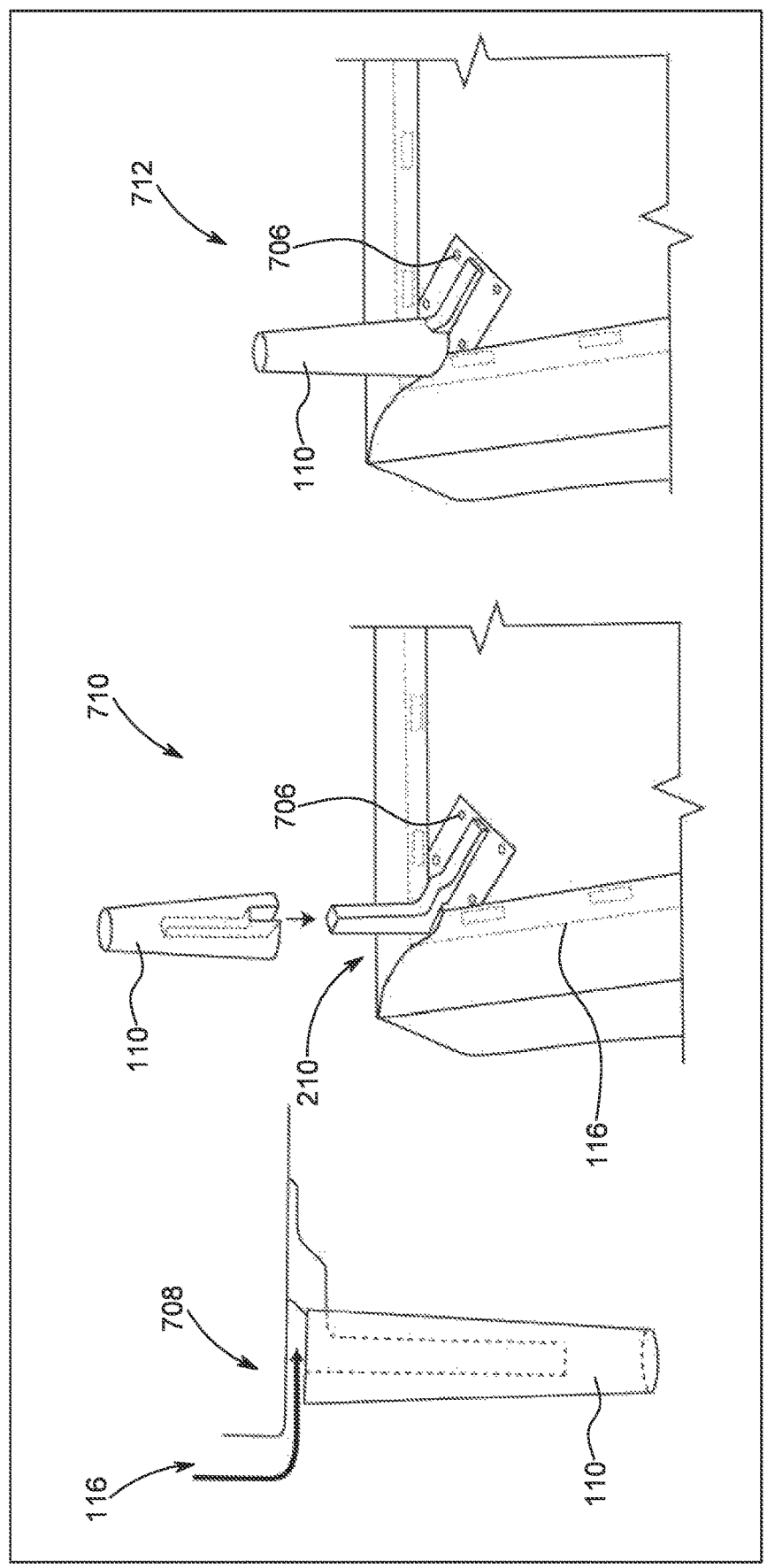

FIGS. 7A and 7B depict snapshots of an attachment between the interchangeable leg casings 110 with the furniture 200 in accordance with the present disclosure. Specifically, FIG. 7A depicts a side view (as shown as view 702) and a furniture 200 bottom view (as shown as view 704). As described above, the metal aperture bar 202 may be disposed under the furniture base 108, as shown in the view 704 of FIG. 7A. In some aspects, the furniture base 108 may include a recess (e.g., ¼ inches recess) that may be configured to receive the metal aperture bar 202. The metal aperture bar 202 may be inserted into the recess such that the metal aperture bar 202 may not be visible from outside. The leg base 210 may be attached to the metal aperture bar 202 via the peg 412 and fasteners (such as screws 706). The interchangeable leg casing 110 may be inserted into the leg base 210, to secure the interchangeable leg casings 110 in the furniture 200.

In some aspects, when the interchangeable leg casing 110 is attached to the leg base 210, a user may insert the interchangeable frame casing 116 in the slot located between the leg base 210 and the metal aperture bar 202 (as described in conjunction with FIGS. 4A-4C), as shown in view 708 of FIG. 7B. In other aspects, the user may attach the interchangeable frame casing 116 and then attach the interchangeable leg casing 110 to the leg base 210, as shown in view 710 of FIG. 7B. The attached interchangeable leg casing 110 and interchangeable frame casing 116 is shown in view 712 of FIG. 7B.

Figure 8:
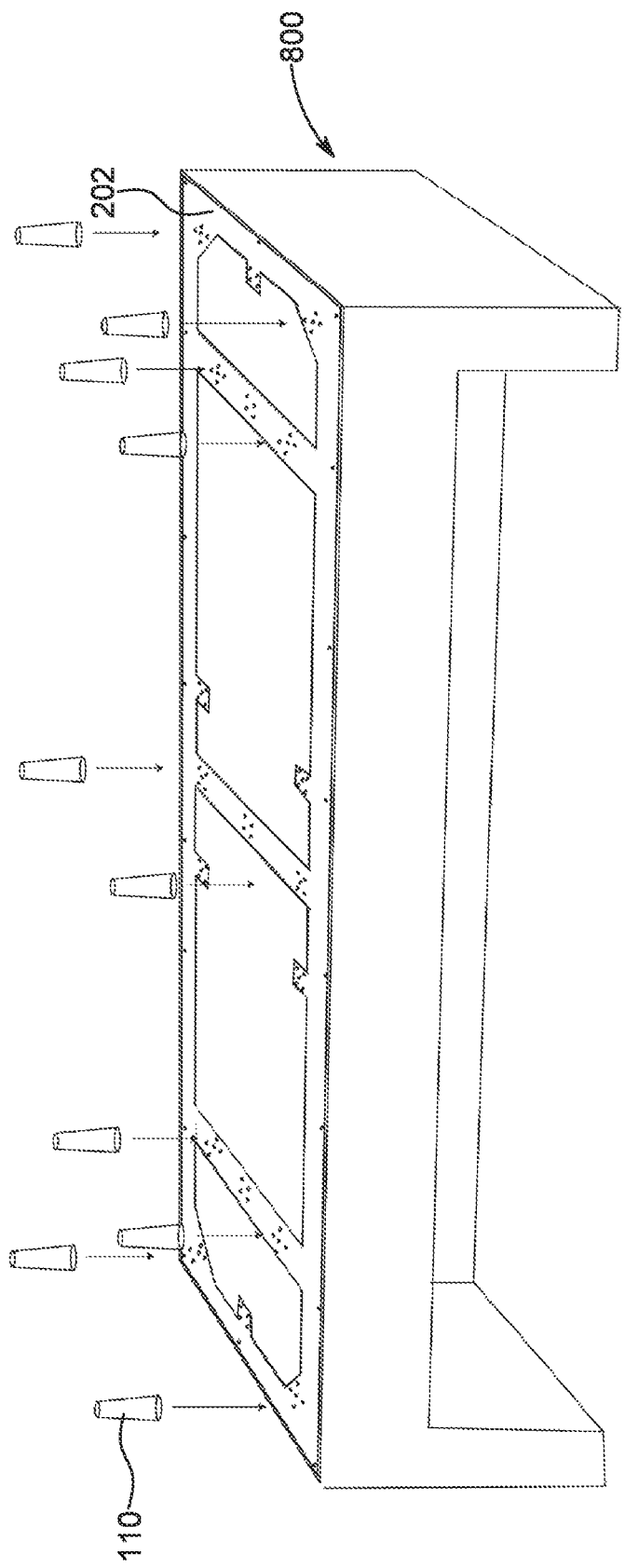
FIG. 8 depicts a bottom view of an example furniture in accordance with the present disclosure.

FIG. 8 depicts a bottom view of an example furniture 800 in accordance with the present disclosure. The furniture 800 may be a sofa, and the interchangeable leg casings 110 may be attached to furniture 800 bottom portion via the metal aperture bar 202 and leg base (not shown in FIG. 8) to secure the interchangeable leg casings 110 to the furniture 800. Other structural details of the furniture 800 may be same as the details of the furniture 200, and hence are not described again here for the sake of simplicity and conciseness.

Figure 9:
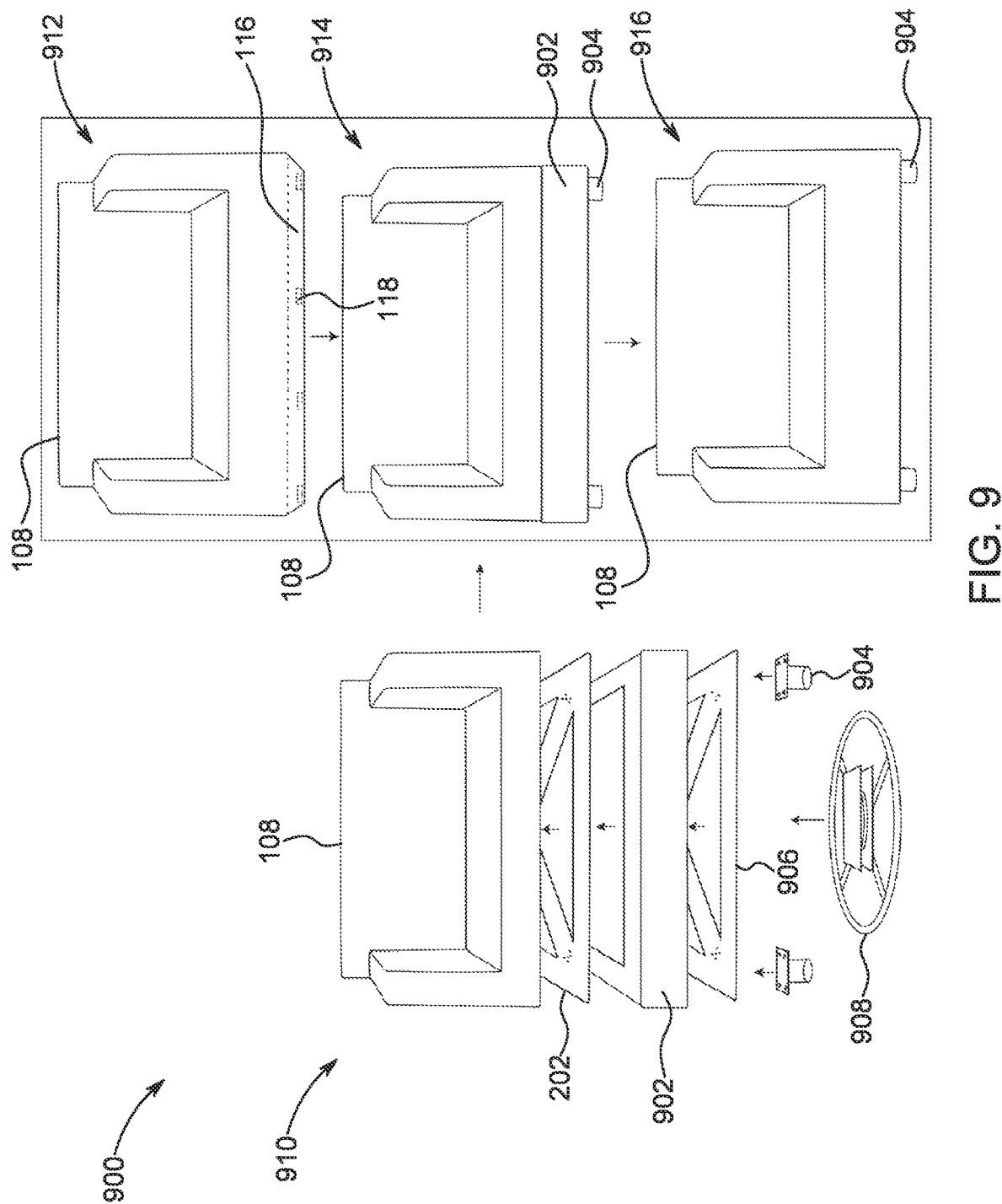
FIG. 9 depicts a front view of another example customizable furniture with interchangeable leg casings and interchangeable frame casing in accordance with the present disclosure.

FIG. 9 depicts a front view of another example customizable furniture 900 (or furniture 900) with interchangeable leg casings and interchangeable frame casing in accordance with the present disclosure. The furniture 900 may be same as the furniture 200.

The interchangeable leg casings of the furniture 900 may include a platform 902 that may be configured to be attached to the furniture base 108 lower portion. The platform 902 may be a block that may be of any shape and/or dimensions, and may be made of any material. For example, the platform 902 may be a rectangular block that may have a size based on furniture base 108 size. The platform 902 may be made of a material that may be same as the furniture base 108 material.

In some aspects, the platform 902 may be removably attached to the furniture base 108 lower portion via the metal aperture bar 202. In some aspects, the platform 902 may include magnetic material that may be configured to magnetically couple the platform 902 with the metal aperture bar 202. Stated another way, the metal aperture bar 202 may be disposed between the platform 902 and the furniture base 108 lower portion. The platform 902 and the metal aperture bar 202 may have equivalent dimensions (such as length and width) so that the platform 902 may be attached to the furniture base 108 in a secure and seamless manner.

In some aspects, the platform 902 may be removably attached with short leg casings 90, via an additional metal aperture bar 906. The additional metal aperture bar 906 and the metal aperture bar 202 may have same shape, dimension and size. The short leg casings 904 may be same as the interchangeable leg casings 110. In some aspects, the short leg casings 904 may have a height shorter than the interchangeable leg casings 110. The short leg casings 904 may be attached to the additional metal aperture bar 906 in the same manner as the interchangeable leg casings 110 (e.g., via the leg base 210, as described above in conjunction with FIG. 2).

In some aspects, the additional metal aperture bar 906 may enable the short leg casings 904 to be attached to the platform 902, as shown in view 910 of FIG. 9. Similarly, additional metal aperture bar 906 may enable the interchangeable frame casing 116 to be attached to the furniture base 108 (e.g., by magnetically coupling the magnets 118 and the additional metal aperture bar 906), as shown in view 912, to create a customizable furniture, as shown in views 914 and 916. Alternatively, the platform 902 may be removably attached with a swivel component 908 instead of the short leg casings 904 to enable the furniture 900 to swivel.

Figure 10:
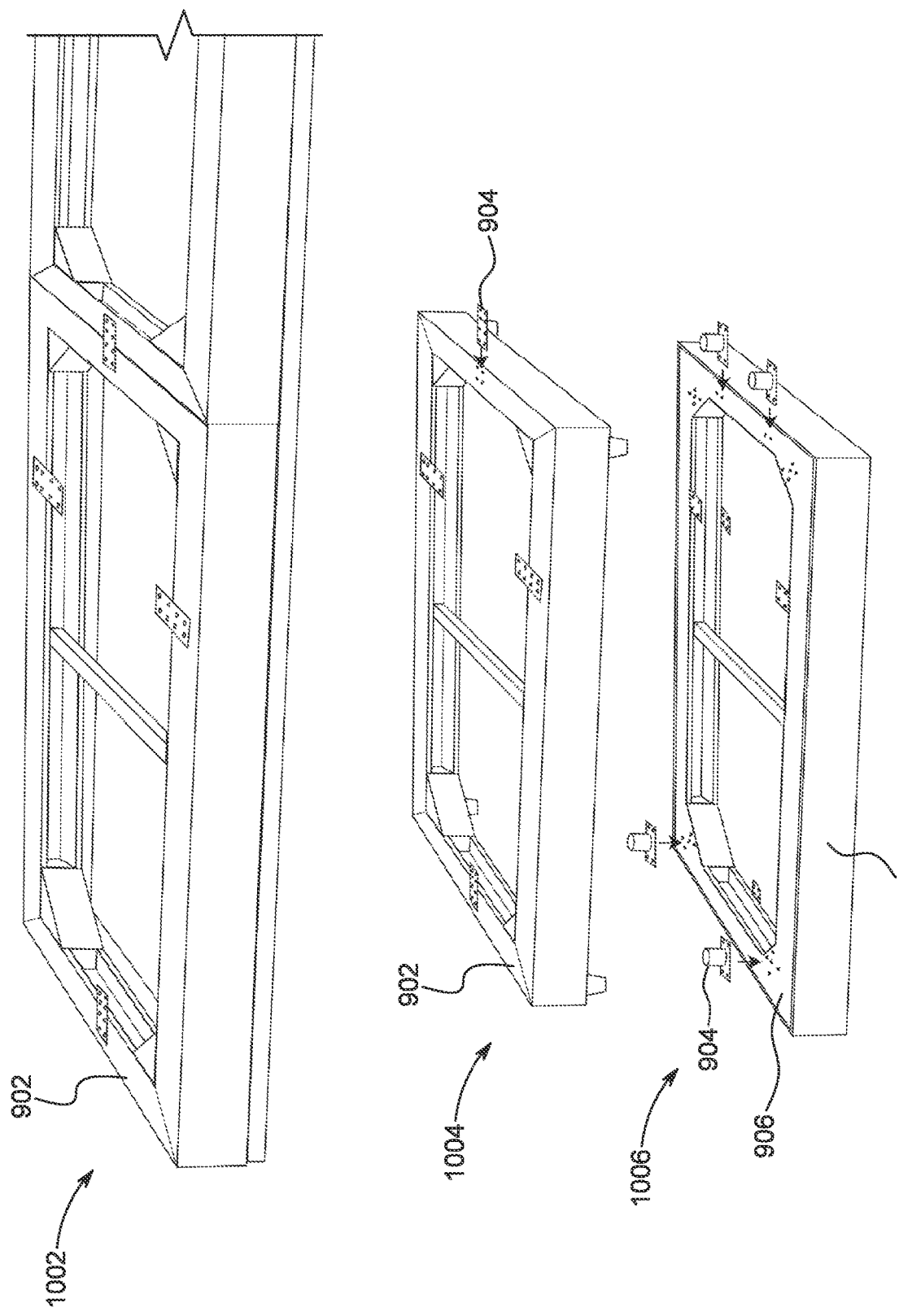
FIG. 10 depicts isometric side views of example platforms in accordance with the present disclosure.

FIG. 10 depicts isometric side views of example platforms in accordance with the present disclosure. The platforms depicted in FIG. 10 may be same as the platform 902 that may be attached to furniture base 108 lower portion (e.g., under the furniture base 108). The platform 902 may be removably connected/attached with another platform as shown in view 1002 of FIG. 10. The platforms 902 may be connected to extend furniture design longitudinally or laterally.

FIG. 10 further depicts a top isometric view 1004 and a bottom isometric view 1006 of the platform 902. As described above, the platform 902 may be removably attached with the short leg casings 904. Specifically, the bottom isometric view 1006 depicts the additional metal aperture bar 906 that may be disposed under the platform 902. The additional metal aperture bar 906 may enable the short leg casings 904 to be attached to the platform 902.

Figure 11:
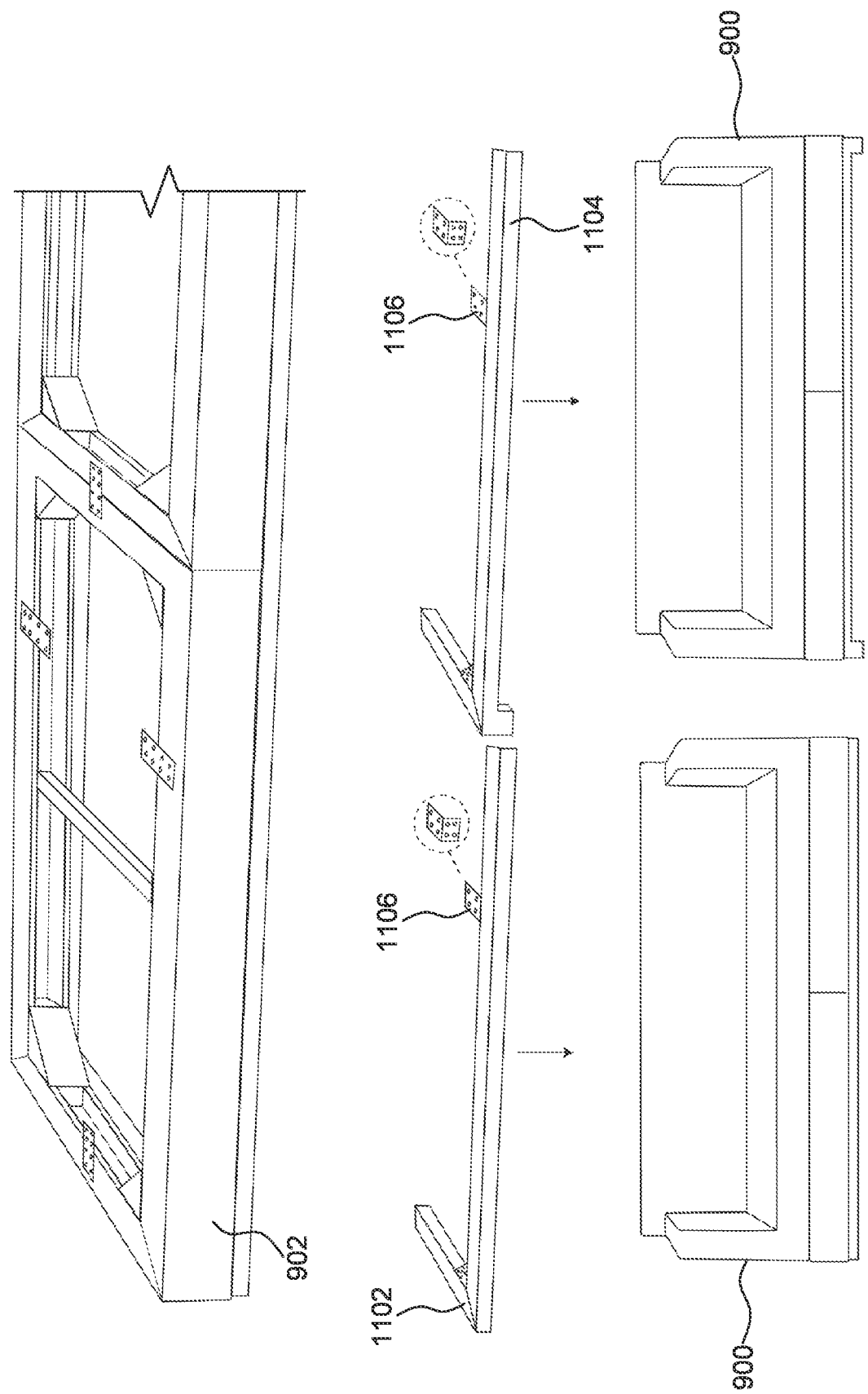
FIG. 11 depicts example interchangeable legs configured to be attached to the platform of FIG. 10 in accordance with the present disclosure.

FIG. 11 depicts example interchangeable legs 1102, 1104 configured to be attached to the platform 902 in accordance with the present disclosure. The interchangeable legs 1102, 1104 may include multiple pieces that may be assembled together and attached to the platform 902. The interchangeable legs 1102, 1104 may be removably attached to the platform 902 via a connector 1106 (such as bracket), as shown in FIG. 11. The connector 1106 may be positioned anywhere on the platform 902 to make different designs of the furniture 900.

Figure 12:
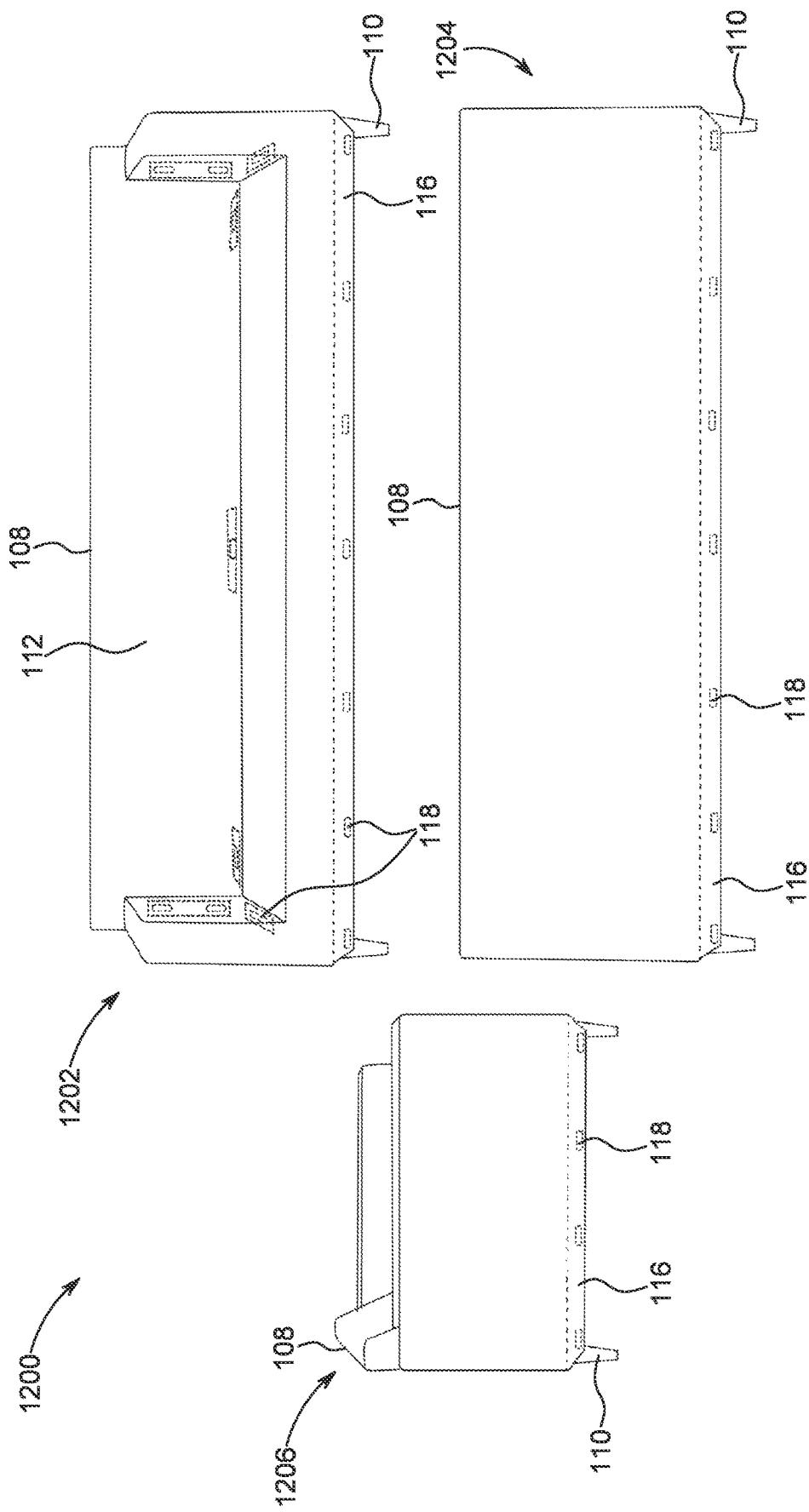
FIG. 12 depicts front, side and back views of another customizable furniture in accordance with the present disclosure.

FIG. 12 depicts a front view 1202, a side view 1206, and a back view 1204 of another customizable furniture 1200 in accordance with the present disclosure. The furniture 1200 may be a two seater sofa. Although FIG. 12 depicts two-seater sofa, a person ordinarily skilled in the art may appreciate that the sofa may be of any shape and design, and may have any dimension. The furniture 1200 may include the interchangeable frame casing 116, the interchangeable leg casings 110 (that may be connected via leg base 210), the magnets 118, the metal aperture bar 202, and other components described above. Since furniture 1200 components are same as the furniture components described above, furniture 1200 is not described again here for the same of simplicity and conciseness.

Figure 13:
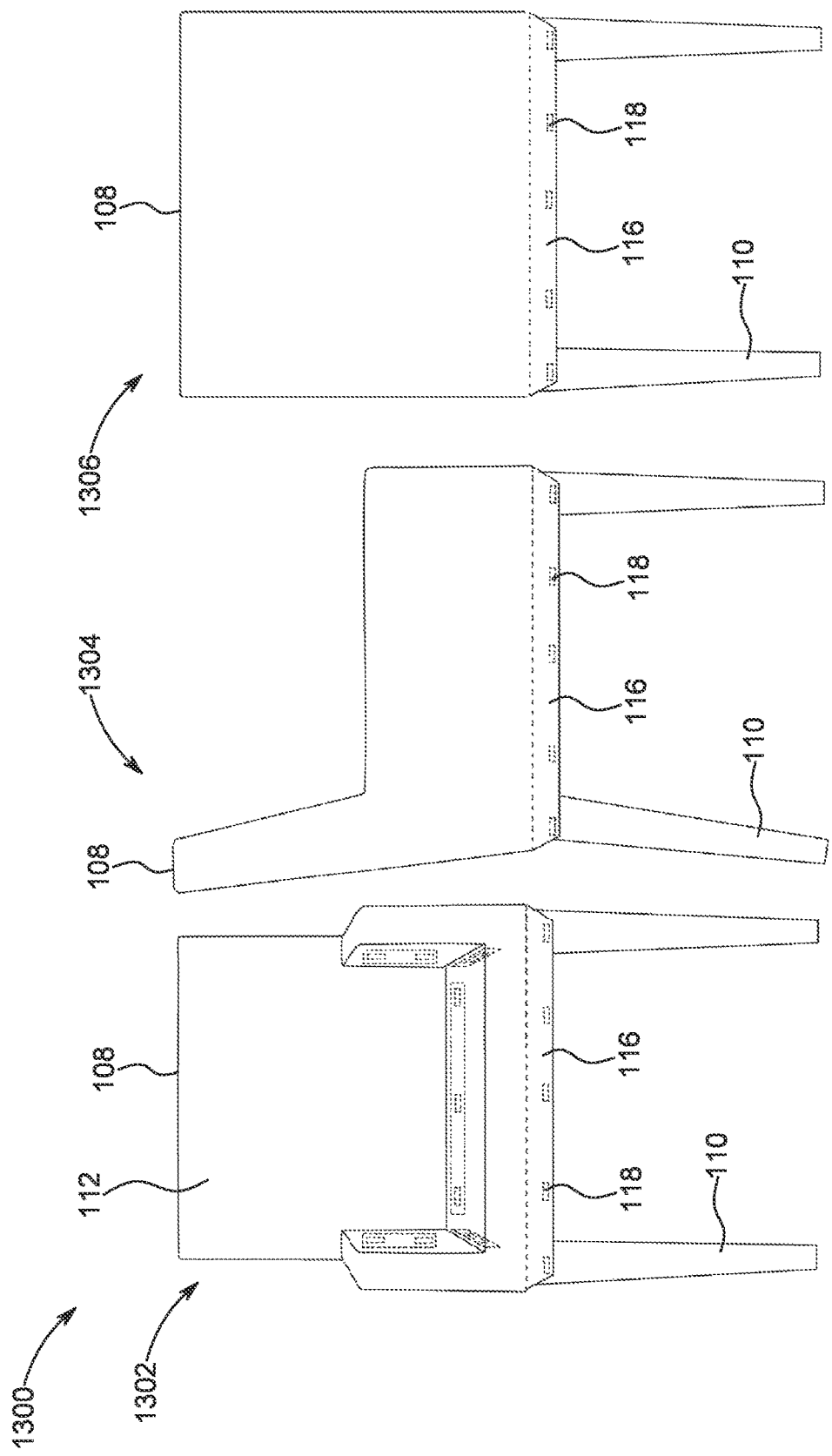
FIG. 13 depicts front, side and back views of yet another customizable furniture in accordance with the present disclosure.

FIG. 13 depicts a front view 1302, a side view 1304, and a back view 1306 of another customizable furniture 1300 in accordance with the present disclosure. The furniture 1300 may be a dining chair. The furniture 1300 may include the interchangeable frame casing 116, the interchangeable leg casings 110 (that may be connected via leg base 210), the magnets 118, the metal aperture bar 202, and other components discussed in conjunction with figures described above. Details of the furniture 1300 may be understood in conjunction with FIGS. 14, 15A and 15B.

FIG. 14 depicts the customizable furniture 1300 with the interchangeable leg casings 110 in accordance with the present disclosure. The furniture 1300 may include a furniture base 1402 (which may be same as the furniture base 108). The furniture base 1402 may be a frame or a sitting area on which the user may sit. The furniture base 1402 may include a backrest to provide comfort to the user. The furniture 1300 may include the metal aperture bar 202 that may be disposed under the furniture base 1402, as shown in view 1404.

The metal aperture bar 202 may enable coupling of the interchangeable frame casing 116 (not shown in FIG. 14) and the interchangeable leg casings 110 to the furniture base 1402. In some aspects, the interchangeable leg casings 110 may be coupled to the metal aperture bar 202 via the leg base 210, as shown in view 1406 and in the same manner as described above. The interchangeable leg casings 110 may include the magnet 504 (not shown in FIG. 14) to magnetically couple the interchangeable leg casings 110 with the metal aperture bar 202. The furniture 1300 may include four leg casings that may be attached to the metal aperture bar 202 via four leg bases.

Figure 15B:
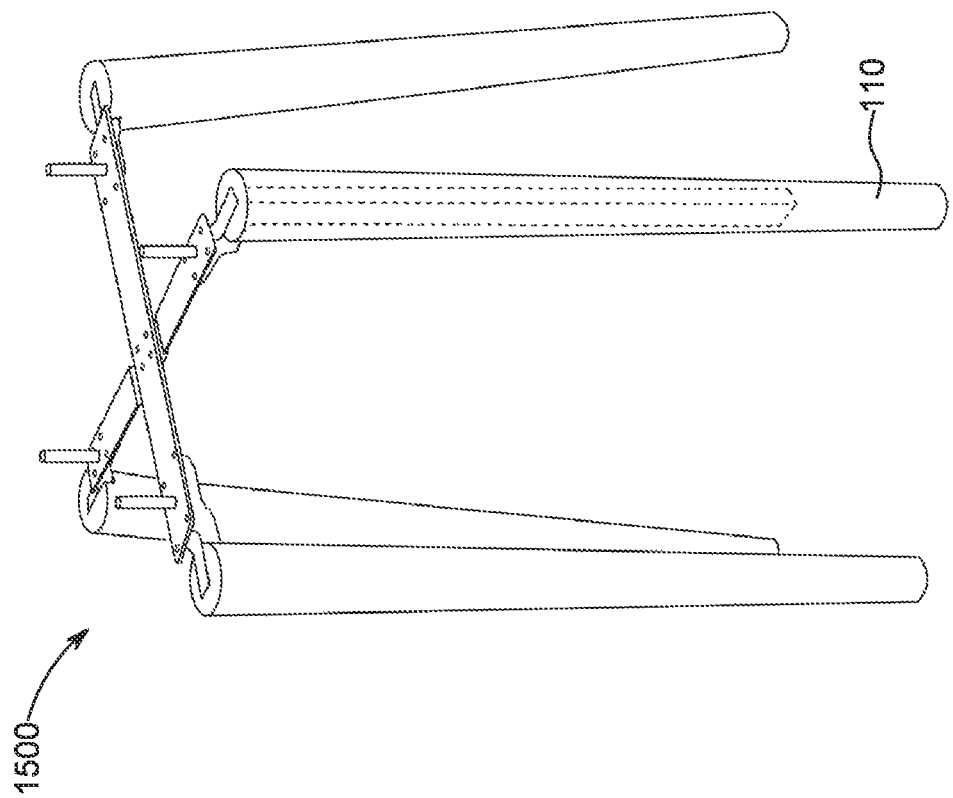
FIGS. 15A and 15B depict an example leg base and attachment of the leg base with interchangeable leg casings in accordance with the present disclosure.
Figure 15A:
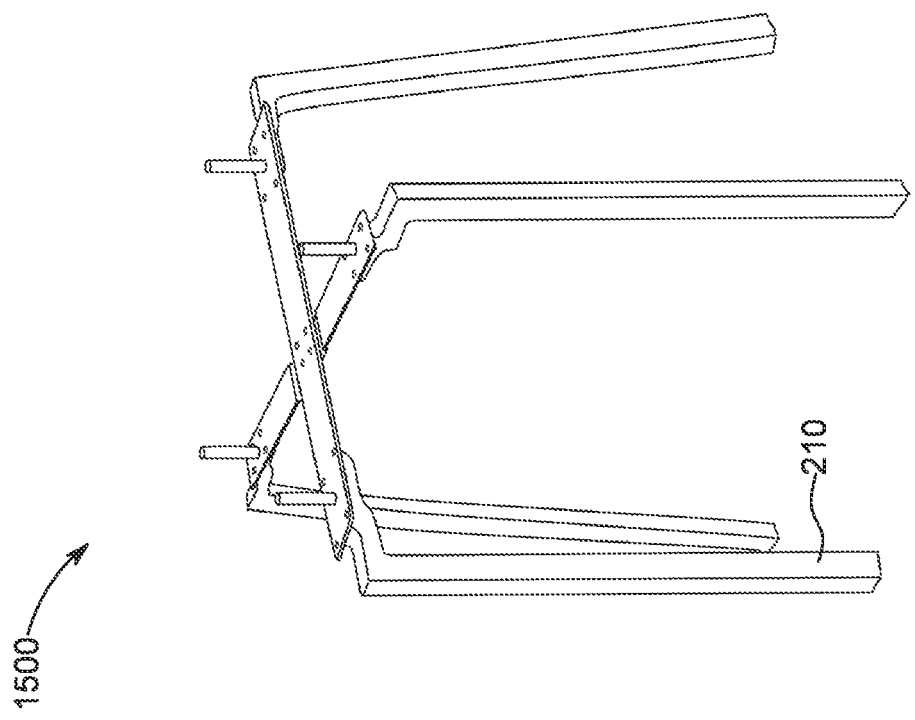

FIGS. 15A and 15B depict an exemplary leg base and attachment of the leg base with the interchangeable leg casings in accordance with the present disclosure. Specifically, FIG. 15A depicts an example leg base 1500 for the furniture 1300. The leg base 1500 may include four leg bases 210 that may be connected together (e.g., pre-assembled), and the leg base 1500 may be inserted into the metal aperture bar 202 (not shown in FIG. 15A). The interchangeable leg casings 110 may be removably coupled to the leg base 1500 as shown in FIG. 15B, and as described above.

Figure 16:
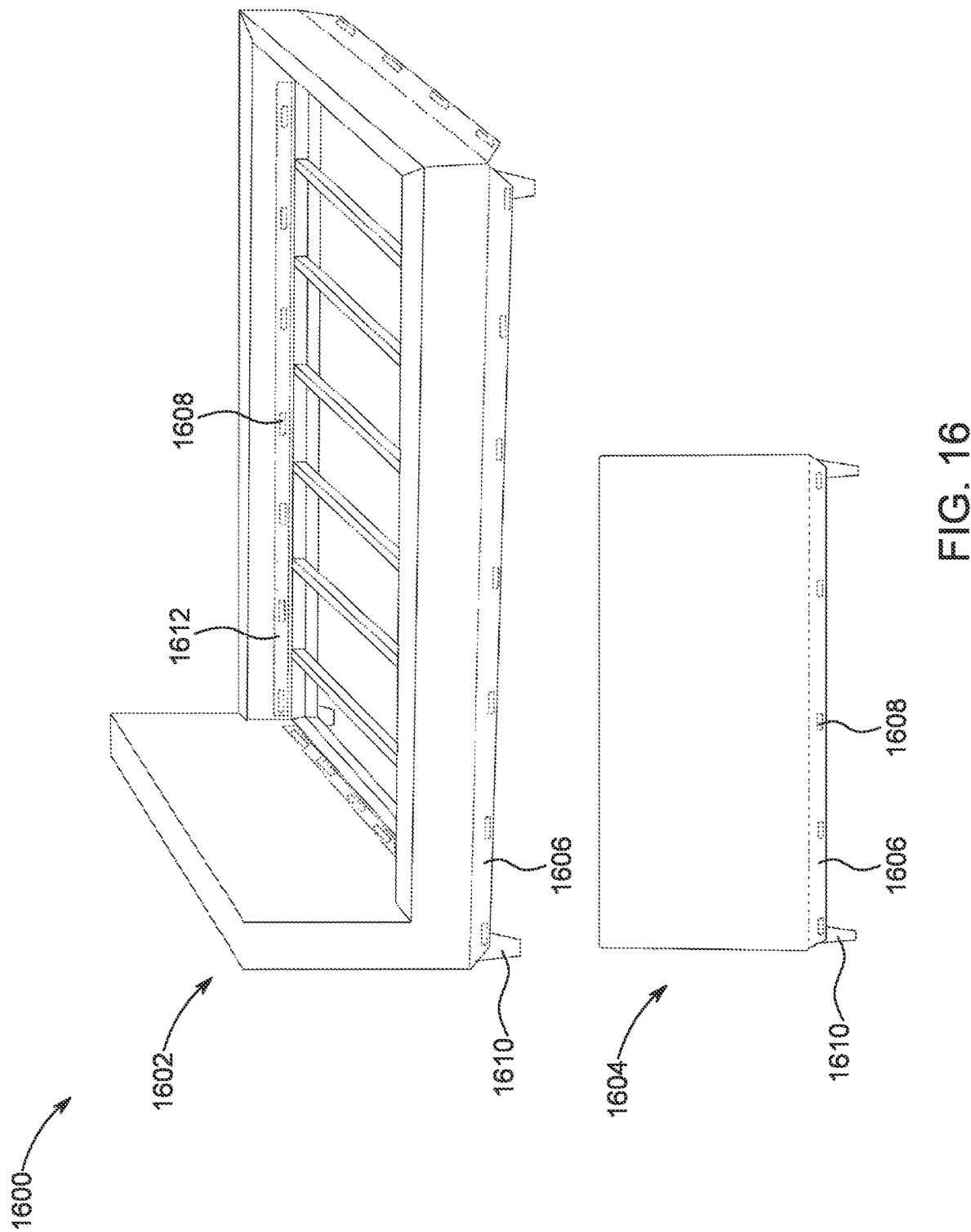
FIG. 16 depicts isometric and back views of another customizable furniture in accordance with the present disclosure.

FIG. 16 depicts an isometric view 1602 and a back view 1604 of another customizable furniture 1600 in accordance with the present disclosure. The furniture 1600 may be a bed frame. The furniture 1600 may include an interchangeable frame casing 1606 (same as the interchangeable frame casing 116) that may include magnets 1608 (same as the magnets 118) disposed at the hem of the interchangeable frame casing 1606. The furniture 1600 may further include interchangeable leg casings 1610 (same as the interchangeable leg casings 110) that may be connected to the furniture 1600 via a leg base (not shown in FIG. 16, same as the leg base 210). The furniture 1600 may further include a metal aperture bar 1612 that may be disposed at inner periphery of the furniture 1600 top surface, as shown in FIG. 16. The metal aperture bar 1612 may be configured to removably connect the interchangeable frame casing 1606 to the furniture 1600, similar to the metal aperture bar 202. The furniture 1600 may include an additional metal aperture bar (not shown) that may be disposed on a furniture 1600 lower portion. The additional metal aperture bar may be configured to removably connect the interchangeable leg casings 1610 to the furniture 1600, similar to the metal aperture bar 202.

Figure 17:
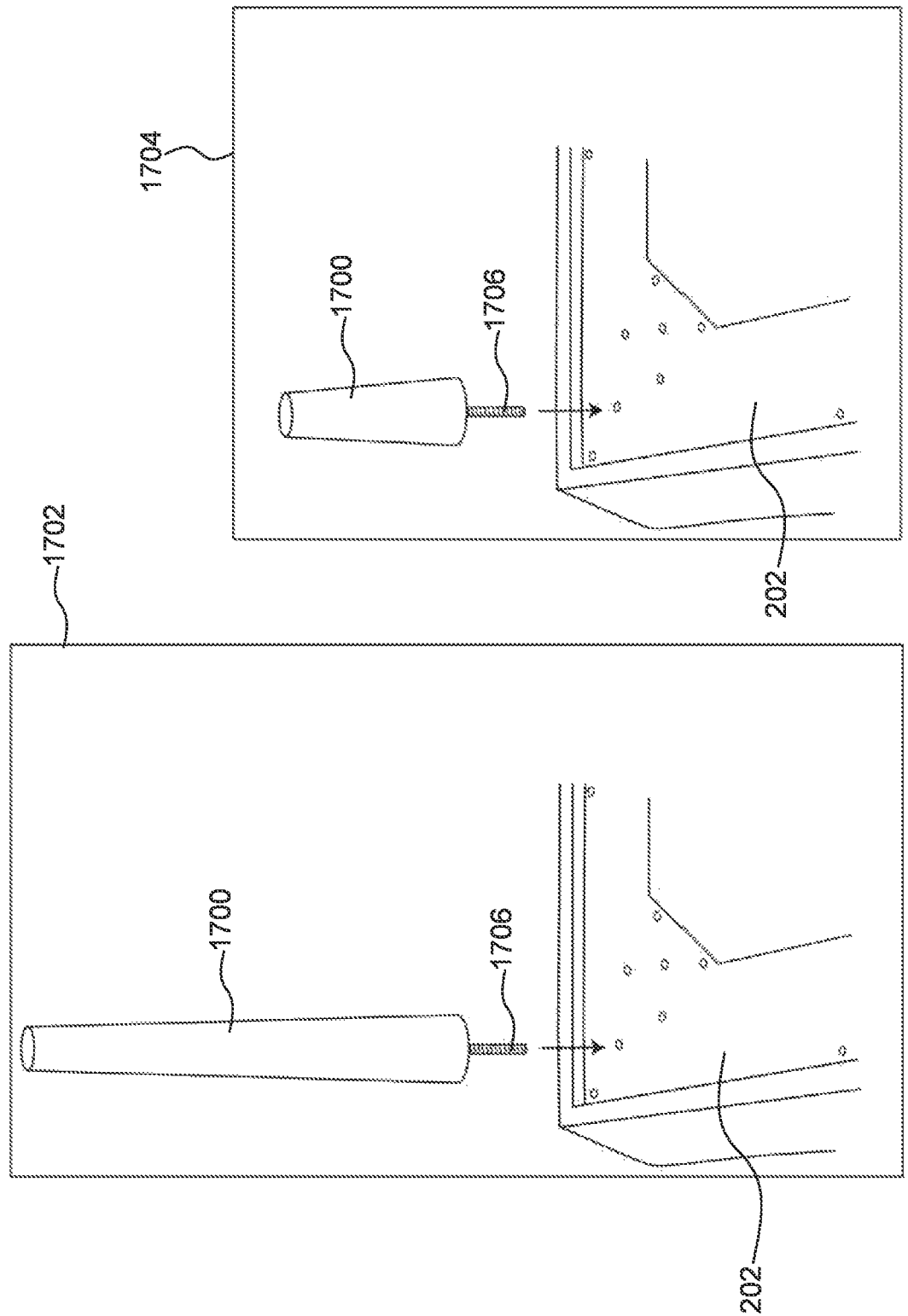
FIG. 17 depicts snapshots of an attachment between an interchangeable leg with an example furniture in accordance with the present disclosure.

FIG. 17 depicts snapshots of an attachment between an interchangeable leg 1700 with an example furniture in accordance with the present disclosure. The example furniture may be a chair or a sofa. The interchangeable leg 1700 may be attached to a furniture bottom portion via the metal aperture bar 202. For example, the interchangeable leg 1700 may be attached to the chair bottom portion as shown in view 1702, and may be attached to the sofa as shown in view 1704.

The interchangeable leg 1700 may include a screw 1706 at a leg top end, as depicted in FIG. 17. The screw 1706 may be inserted in holes or apertures located in the metal aperture bar 202. Thus, the interchangeable leg 1700 may be directly inserted into the furniture bottom portion without the leg base 210.

Figure 18:
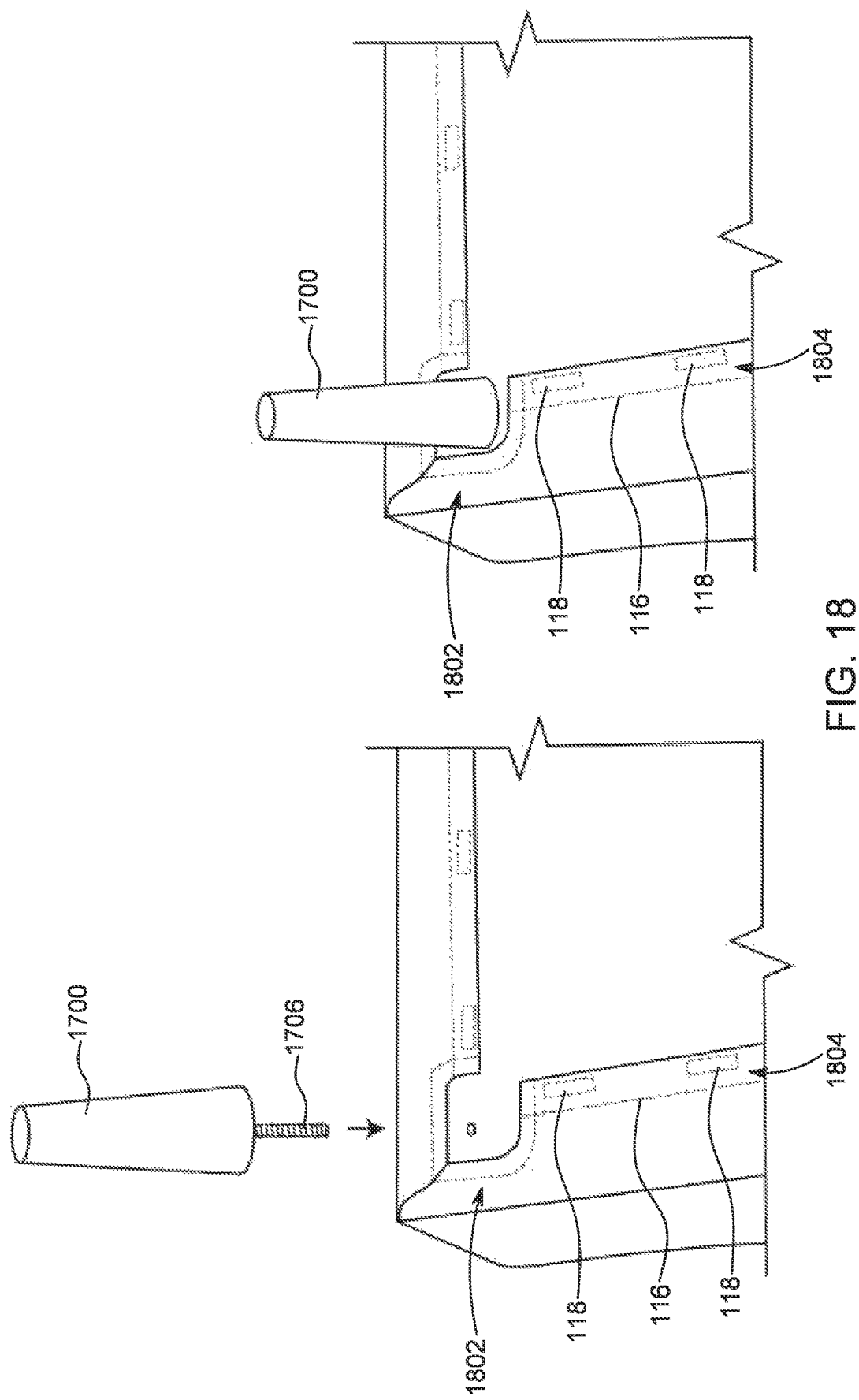
FIG. 18 depicts snapshots of a bottom view of the furniture with interchangeable frame casing and the interchangeable legs of FIG. 17.

FIG. 18 depicts snapshots of a bottom view of the furniture with the interchangeable frame casing 116 and the interchangeable legs 1700 of FIG. 17. As described above, the interchangeable frame casing 116 may include the magnets 118 that may be disposed in hem associated with the interchangeable frame casing 116. The hem may have different widths at different locations. For example, the hem at a corner position 1802 may be 0.5 to 1 inches in width, and the hem at another portion such as a portion 1804 may be 1 and ¾ inches to 3 inches in width. The interchangeable legs 1700 may be inserted in the corner position 1802 (in the hole/aperture in the metal aperture bar 202) via the screw 1706 as described in conjunction with FIG. 17.

Figure 19:
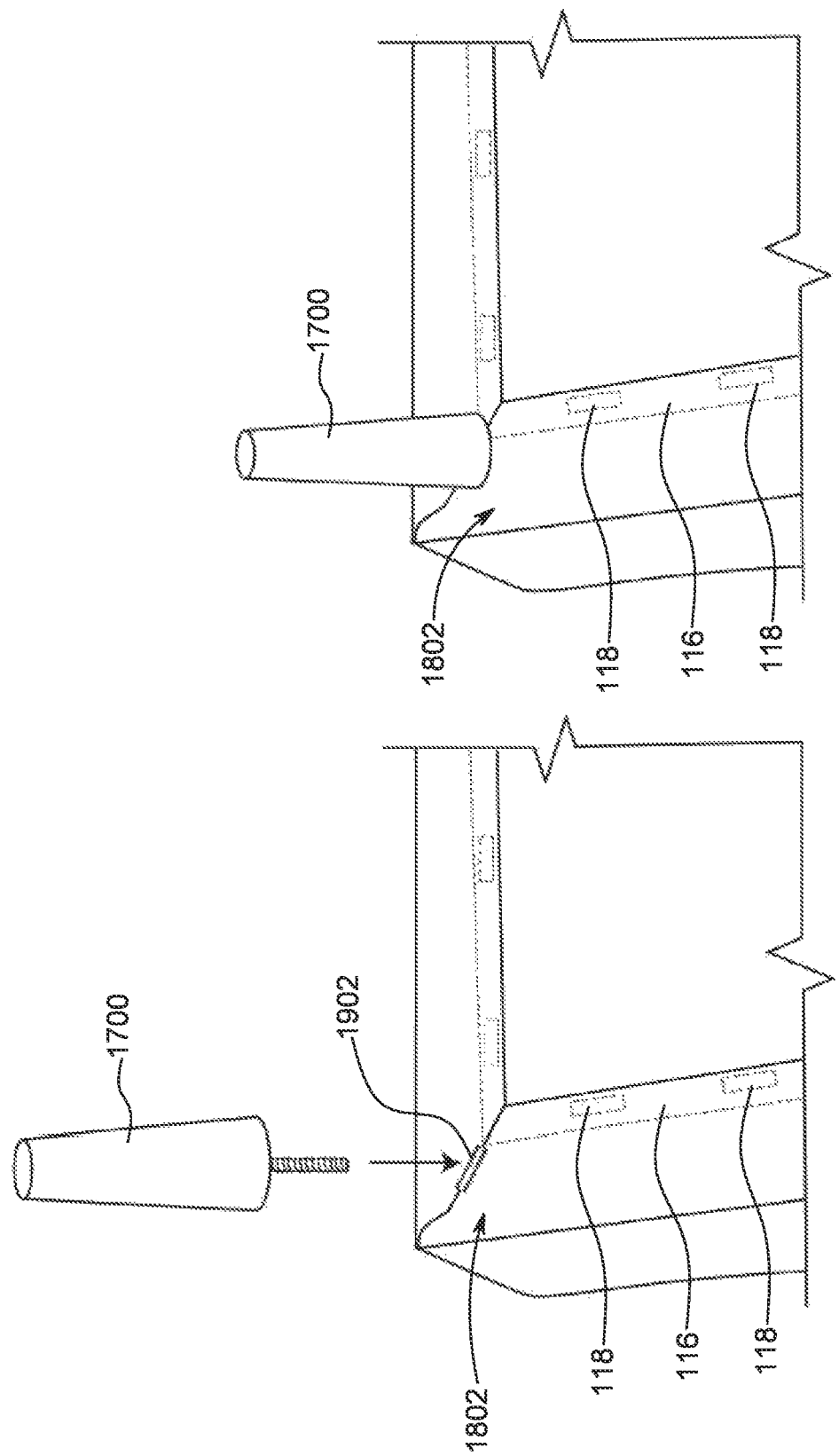
FIG. 19 depicts other snapshots of the bottom view of the furniture with interchangeable frame casing and the interchangeable legs of FIG. 17.

FIG. 19 depicts other snapshots of the bottom view of the furniture with the interchangeable frame casing 116 and the interchangeable legs 1700 of FIG. 17. In some scenarios, the corner position 1802 may include a buttonhole 1902 and the interchangeable legs 1700 may be inserted in the corner position 1802 via the buttonhole 1902.

Figure 20A:
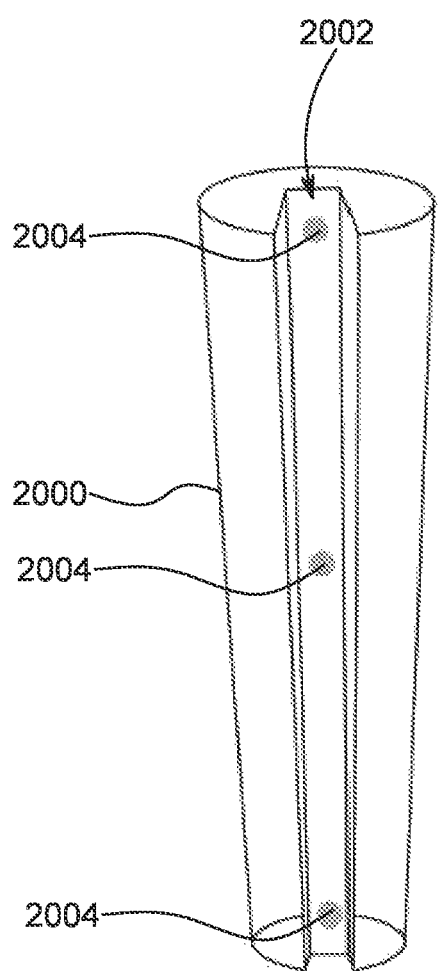
FIGS. 20A and 20B depict snapshots of another interchangeable leg casing and attachment between a leg base and the other interchangeable leg casing in accordance with the present disclosure.
Figure 20B:
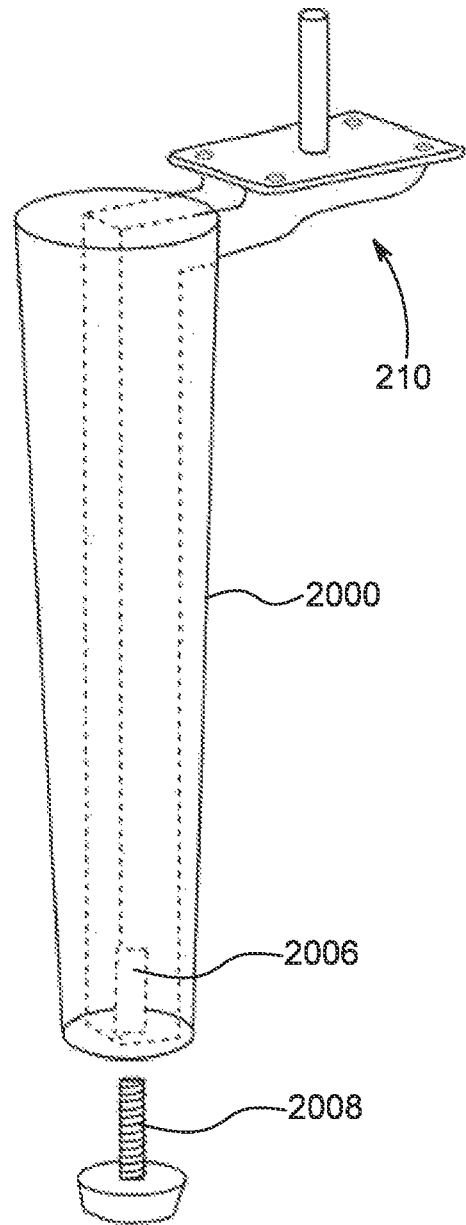

FIGS. 20A and 20B depict snapshots of another interchangeable leg casing 2000 and attachment between a leg base (such as the leg base 210) and the interchangeable leg casing 2000 in accordance with the present disclosure. The other interchangeable leg casing 2000 may include a cut portion 2002 at a leg casing side surface throughout leg casing length as depicted in FIG. 20A. The cut portion 2002 may include a plurality of magnets 2004 that may be disposed throughout the leg casing length, and at a predetermined distance from adjacent magnets. The cut portion 2002 may be configured to receive the leg base 210. Since the leg base 210 is made of metal, the leg base 210 may be magnetically coupled to the plurality of magnets 2004, and thus enable attachment of the leg base 210 with the interchangeable leg casing 2000. In further aspects, the interchangeable leg casing 2000 may include a slot 2006 disposed at an interchangeable leg casing bottom portion. The slot 2006 may be configured to receive an external component 2008. The external component 1808 may include, for example, a height adjusting component, a leg supporting element, an adjustable leveler for stability on uneven floors, and/or the like.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:
 a furniture base comprising an upper base portion and a lower base portion;
 a metal aperture bar extending at the lower base portion;
 a leg base configured to be inserted in the metal aperture bar; and an interchangeable leg casing configured to be removably attached to the leg base to enable attachment of the interchangeable leg casing with the furniture base, wherein the interchangeable leg casing comprises a cavity to receive the leg base, wherein the leg base comprises a first member and a second member integrated with each other, wherein the first member is configured to be inserted into the cavity, and wherein the second member extends laterally from a first member top portion.

2. The system of claim 1, wherein the first member is disposed at a predetermined angle relative to the second member.

3. The system of claim 1, wherein the second member comprises a proximal end and a distal end, and wherein the proximal end is attached to the first member top portion.

4. The system of claim 3, wherein the distal end comprises a connection unit configured to attach the leg base with the metal aperture bar.

5. The system of claim 4, wherein the connection unit comprises a peg configured to be inserted into the metal aperture bar, and wherein a peg longitudinal axis is parallel to a first member longitudinal axis.

6. The system of claim 4, wherein the connection unit is disposed at a predetermined height from the first member top portion.

7. The system of claim 1, wherein the interchangeable leg casing comprises a first magnetic material, and wherein the leg base comprises a second magnetic material.

8. The system of claim 1 further comprising an interchangeable frame casing configured to cover the upper base portion.

9. The system of claim 8, wherein the interchangeable frame casing comprises a third magnetic material configured to magnetically attach to the metal aperture bar.

10. The system of claim 9, wherein the third magnetic material is disposed on interchangeable frame casing edges.

11. The system of claim 1, wherein the furniture base is at least one of a sofa, a bed, a bench, a table, a chaise, a headboard, and a chair.

12. A system comprising:
a furniture base comprising an upper base portion and a lower base portion;
a metal aperture bar disposed on the furniture base;
a leg base configured to be inserted in the metal aperture bar;
an interchangeable leg casing configured to be removably attached to the leg base to enable attachment of the interchangeable leg casing with the furniture base, wherein the interchangeable leg casing comprises a cavity to receive the leg base; and
an interchangeable frame casing configured to cover the upper base portion, wherein the interchangeable frame casing is magnetically connected to the metal aperture bar.

13. The system of claim 12, wherein the leg base comprises a first member and a second member integrated with each other, and wherein the first member is configured to be inserted into the cavity.

14. The system of claim 13, wherein the first member is disposed at a predetermined angle relative to the second member.

15. The system of claim 13, wherein the second member extends laterally from a first member top portion.

16. The system of claim 15, wherein the second member comprises a proximal end and a distal end, and wherein the proximal end is attached to the first member top portion.

17. The system of claim 16, wherein the distal end comprises a connection unit configured to attach the leg base with the metal aperture bar.

18. A system comprising:
a furniture base comprising an upper base portion and a lower base portion;
a metal aperture bar extending at the lower base portion;
a leg base configured to be inserted in the metal aperture bar; and
an interchangeable leg casing configured to be removably attached to the leg base to enable attachment of the interchangeable leg casing with the furniture base, wherein the interchangeable leg casing comprises a cavity to receive the leg base,
wherein the leg base comprises a first member and a second member integrated with each other, wherein the first member is configured to be inserted into the cavity and the second member is configured to be attached to the metal aperture bar, and wherein the second member extends laterally from a first member top portion.

* * * * *